(12) United States Patent
Nashida et al.

(10) Patent No.: US 8,577,200 B2
(45) Date of Patent: Nov. 5, 2013

(54) CONTENT EDITING APPARATUS, CONTENT EDITING METHOD AND PROGRAM

(75) Inventors: Tatsushi Nashida, Kanagawa (JP); Akihiro Komori, Tokyo (JP); Takeo Kishida, Osaka (JP)

(73) Assignee: Sony Corporation, Tokyo (JP)

( * ) Notice: Subject to any disclaimer, the term of this patent is extended or adjusted under 35 U.S.C. 154(b) by 1179 days.

(21) Appl. No.: 12/408,761

(22) Filed: Mar. 23, 2009

(65) Prior Publication Data
US 2009/0252474 A1 Oct. 8, 2009

(30) Foreign Application Priority Data
Mar. 24, 2008 (JP) ................. 2008-076690

(51) Int. Cl.
*H04N 5/765* (2006.01)
(52) U.S. Cl.
USPC .............. 386/200; 715/719; 700/94
(58) Field of Classification Search
USPC ............ 715/719; 386/52, 69, E5.003; 700/94
See application file for complete search history.

(56) References Cited

FOREIGN PATENT DOCUMENTS

| JP | 11 317058 | | 11/1999 |
|----|-----------|---|---------|
| JP | 2003 250117 | | 9/2003 |
| JP | 2006024259 | * | 7/2004 |
| JP | 2006173716 | * | 12/2004 |
| JP | 2006 24259 | | 1/2006 |
| JP | 2007228334 | * | 2/2006 |
| JP | 2006 173716 | | 6/2006 |
| JP | 2006173716 | * | 6/2006 |
| JP | 3833149 | | 7/2006 |
| JP | 2007 18571 | | 1/2007 |
| JP | 2007 66409 | | 3/2007 |
| JP | 2007 228334 | | 9/2007 |
| JP | 2009206841 | * | 2/2008 |
| JP | 2009-206841 | * | 9/2009 |
| JP | 2009 206841 | | 9/2009 |
| JP | 2006-24259 | * | 1/2012 |

* cited by examiner

*Primary Examiner* — Jeffrey Pwu
*Assistant Examiner* — Hee Song
(74) *Attorney, Agent, or Firm* — Wolf, Greenfield & Sacks, P.C.

(57) ABSTRACT

There is provided a content editing apparatus, content editing method and program capable of easily and rapidly extracting sections corresponding to a reproducing operation of content data.

The content editing apparatus includes an operation input processing unit 104 into which a reproduction operating command of content data is input by a user and a record controlling unit 108 for recording operation data corresponding to the reproduction operating command input into the operation input processing unit along with a reproduction position of the content data in a recording medium.

11 Claims, 28 Drawing Sheets

FIG.8A

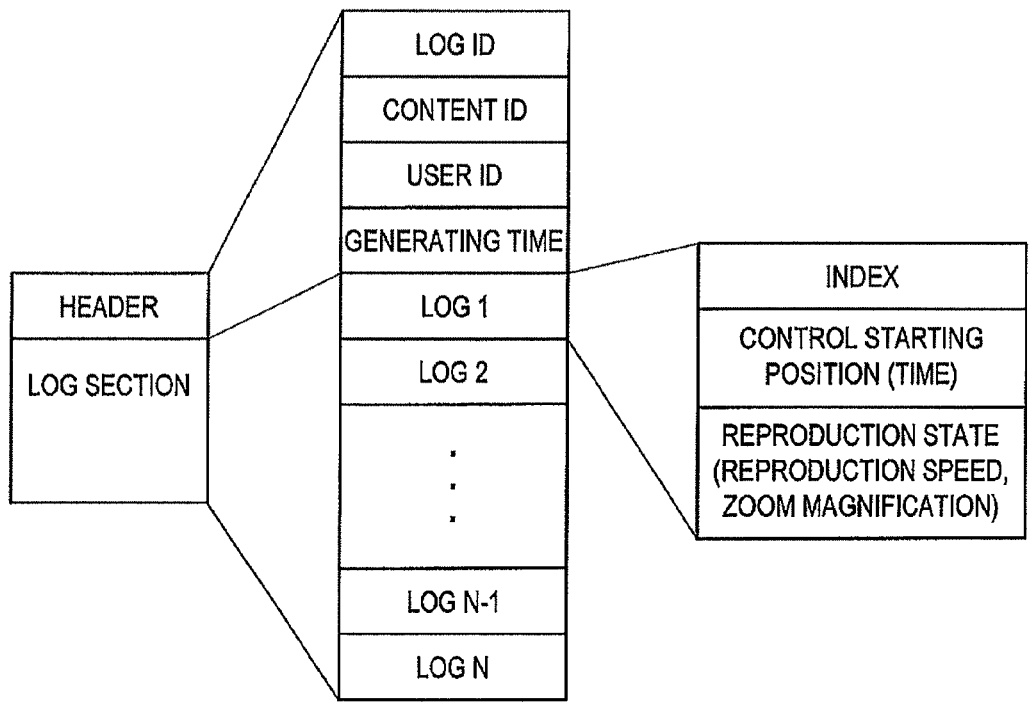

FIG.8B

```
<log id="AAAA-BBBB-CCCC-DDDD" content_id="EEEE-FFFF-GGGG-HHHH">
  <user_name="aabb ccdd" date="yyyymmdd HH:MM:SS"/>
  <index="0" position="00:00:00" speed="START">
  <index="1" position="00:00:00" speed="1.0">
  <index="2" position="01:02:00" speed="0.5">
  <index="3" position="04:30:00" speed="-1.0">
  <index="4" position="04:56:00" speed="1.0" zoom_center="50,70" zoom_scale="2.0">
  <index="5" position="10:00:00" speed="STOP">
</log>
```

FIG.9A

| REPRODUCTION SPEED(v) | SCORE |
|---|---|
| v<-1 | 0 |
| -1≦v≦1 | 1 |
| 1<v≦2 | 0 |
| v>2 | -1 |

FIG.9B

| ZOOM MAGNIFICATION | SCORE |
|---|---|
| z≦1 | 0 |
| z>1 | 1 |

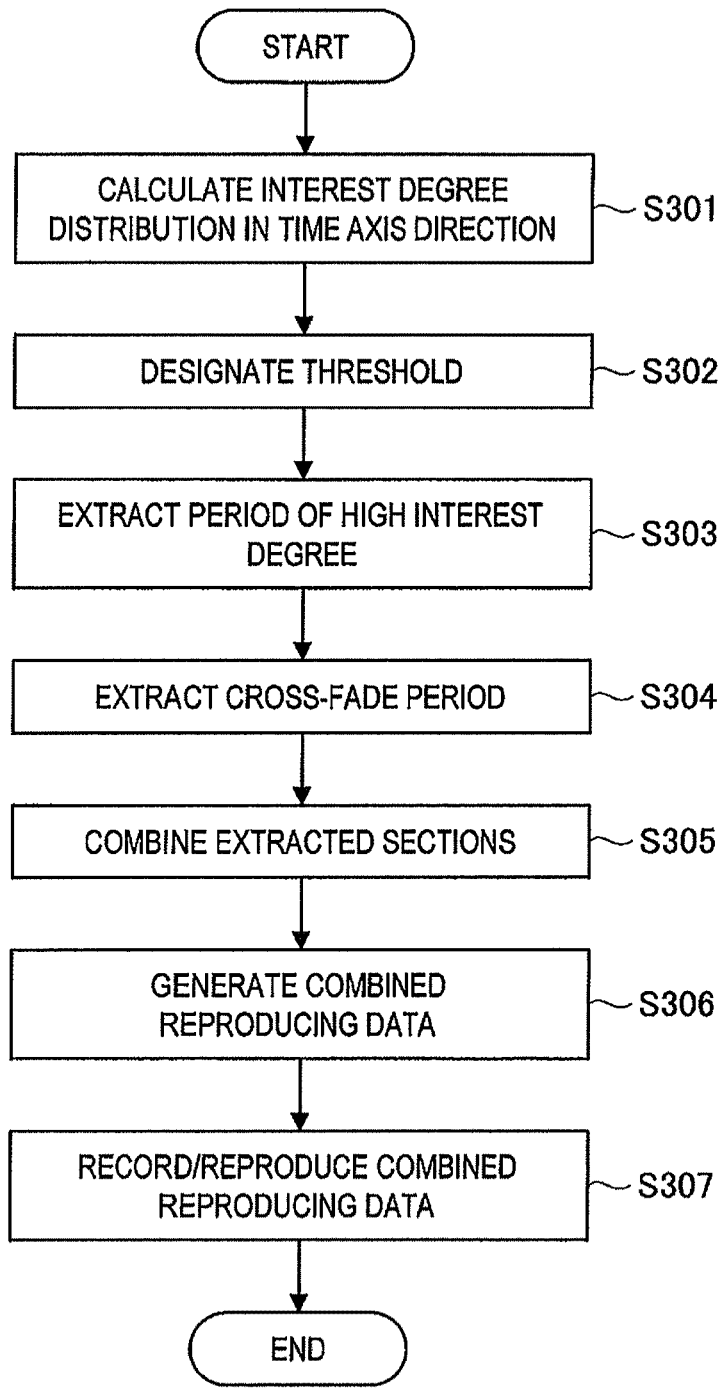

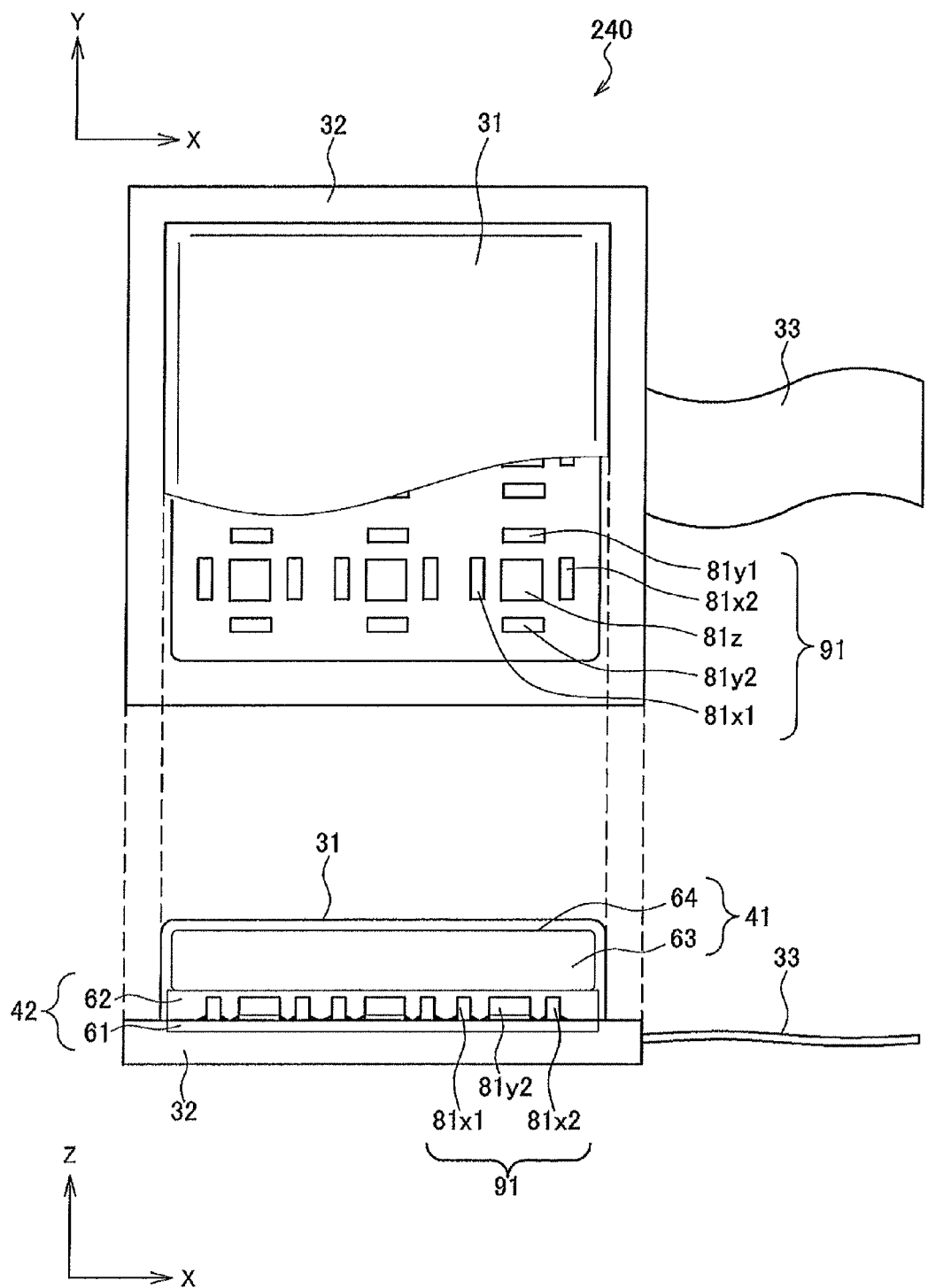

FIG.15
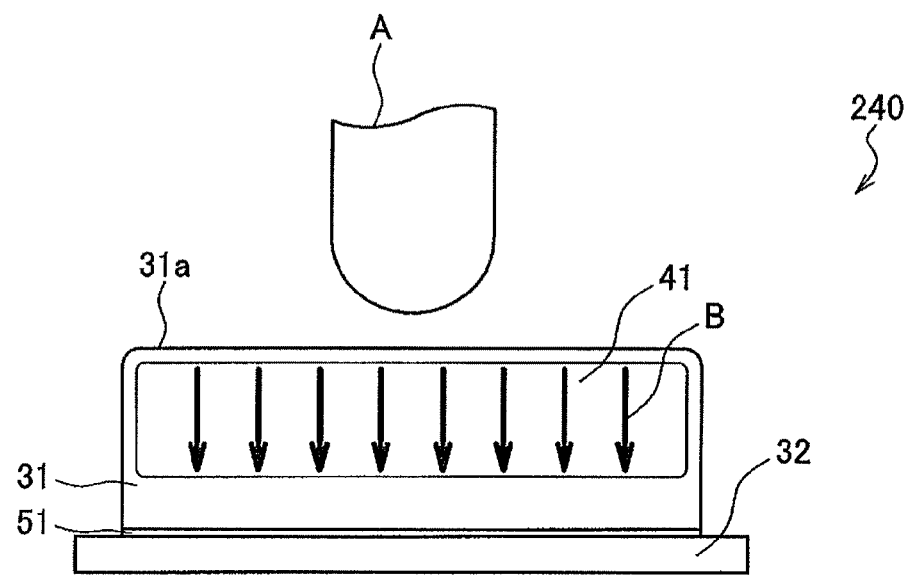
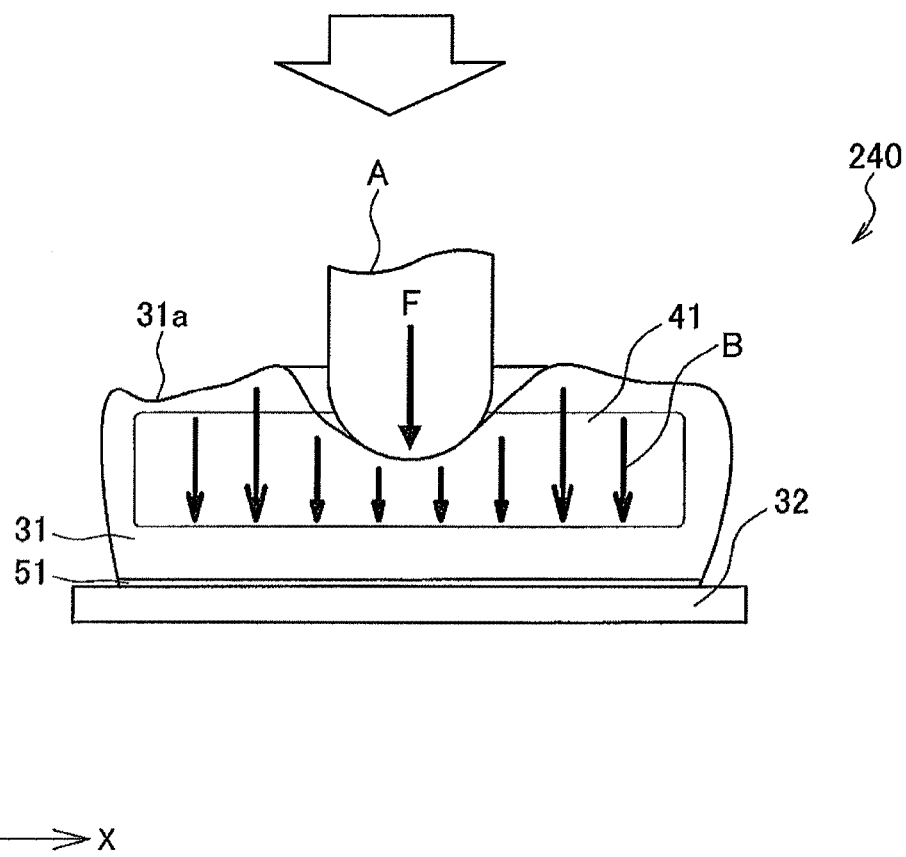

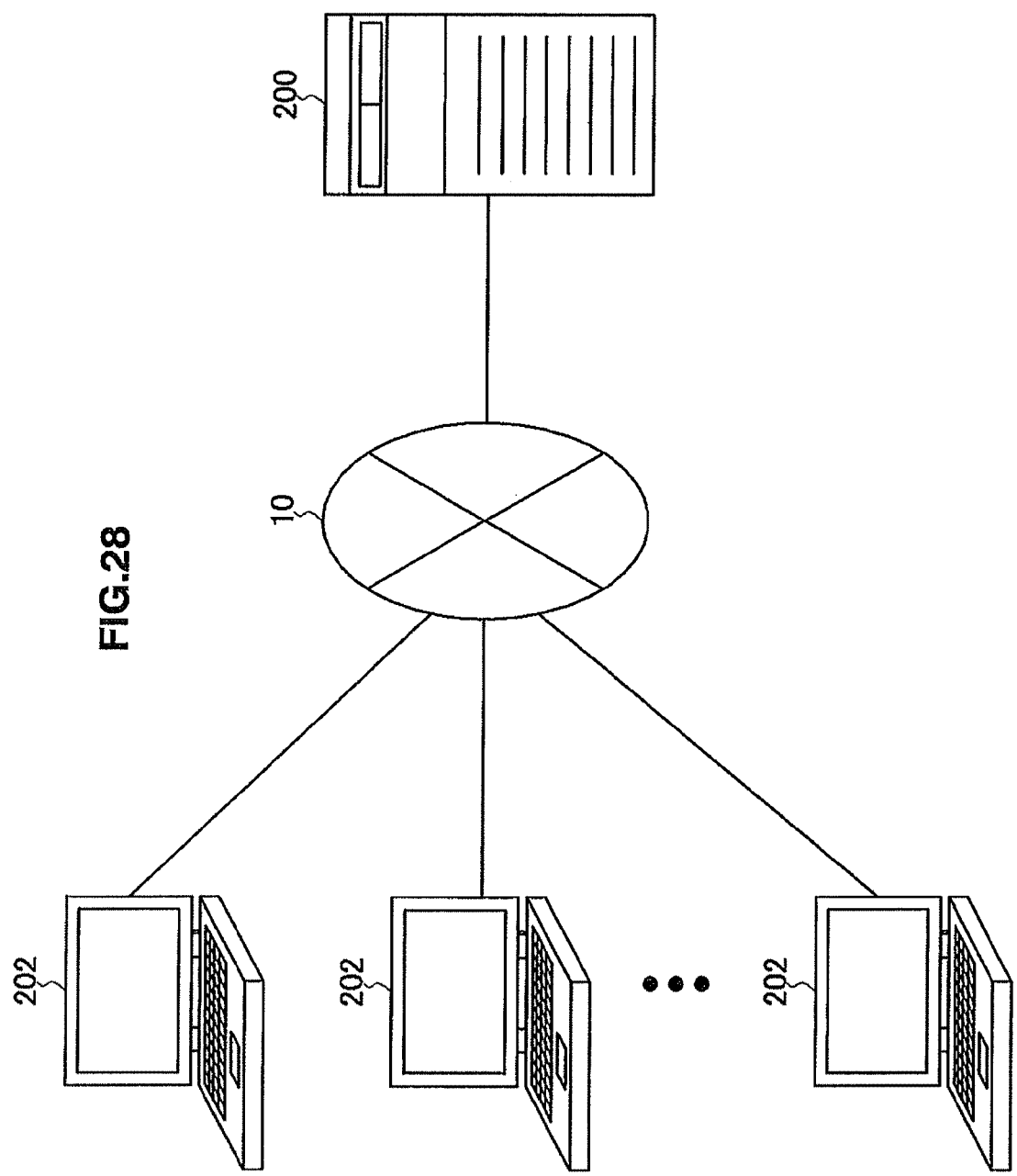

CONTENT EDITING APPARATUS, CONTENT EDITING METHOD AND PROGRAM

CROSS REFERENCE TO RELATED APPLICATIONS

This application claims priority to Japanese Priority Patent Application JP 2008-076690, filed in the Japan Patent Office on Mar. 24, 2008, the entire content of which is hereby incorporated by reference.

BACKGROUND OF THE INVENTION

1. Field of the Invention

The present invention relates to a content editing apparatus, content editing method and program.

2. Description of Related Art

In reproducing video contents such as video files or still images' slideshow, all the data is not reproduced as it is, and after a user arbitrarily edits the data, the edited video contents may be reproduced. One of the video contents editing purposes is to remove unwanted sections from all the data and to generate a digest of the data.

For example, in Japanese Patent No. 3833149, there is disclosed a technique in which, when reproducing a plurality of items of information data, an arbitrary reproducing path among a plurality of reproducing paths can be selected on a display screen. Thus, a user can select an optimal reproducing path for reproduction processing even when a plurality of reproducing paths are set.

SUMMARY OF THE INVENTION

As for edited video contents such as digest, the sections which have been determined to be unnecessary and removed during editing may be desired to be added and the reedited digest may be desired to be viewed. However, it is difficult to search for sections desired to be added from among all the data (original data) of the video contents, and also the original data may have been deleted already.

Even when the digest is generated, the sections which are determined to be important for one user may be determined to be unnecessary for the other user and vice versa. Thus, the digest may need to be reedited.

Further, when there are many users viewing one video content, it was difficult to specify in which sections the many users have a common interest. Therefore, there was not an editing method for generating a digest corresponding to the interest sections.

Therefore, the present invention has been made in views of the above issues, and it is desirable to provide a novel and improved content editing apparatus, content editing method and program capable of easily and rapidly extracting a section corresponding to a content data reproducing operation.

According to an embodiment of the present invention, there is provided a content editing apparatus including an operation input processing unit into which a reproduction operating command of content data is input by a user, and a record controlling unit for recording operation data corresponding to the reproduction operating command input into the operation input processing unit along with a reproduction position of the content data in a recording medium.

With the structure, the operation input processing unit is input with a reproduction operating command of content data by a user and the record controlling unit records operation data corresponding to the reproduction operating command input into the operation input processing unit along with a reproduction position of the content data in a recording medium. Consequently, a reproduction position of the content data can be referred to based on the operation data corresponding to the reproduction operating command recorded in the recording medium.

The operation data may include a score which is calculated by a coefficient corresponding to the reproduction operating command. The apparatus may further include a reproduction controlling unit for reproducing the content data depending on the score of the operation data recorded in the recording medium. With the structure, it is possible to divide the content data into sections to be reproduced and sections not to be reproduced depending on the score of the operation data.

The reproduction controlling unit may apply a threshold to divide the content data depending on the score of the operation data recorded in the recording medium and to extract and reproduce the divided content data based on the threshold. With the structure, the content data can be divided based on the threshold by which the score of the operation data is divided.

The reproduction controlling unit may perform the same reproduction controlling as the reproducing operation based on the reproduction operating command recorded in the operation data to reproduce the content data.

The apparatus may further include a display controlling unit for visually displaying a time-varying distribution of the scores of the operation data on a displaying device. The display controlling unit may visually display a threshold for dividing the content data based on the score on the displaying device, and the operation input processing unit may further include a reproduction controlling unit into which a threshold changing command is input by a user for applying a threshold to divide the content data and to extract and reproduce the divided content data based on the threshold.

The apparatus may further include a filing processing unit for applying a threshold to divide the content data depending on the score of the operation data recorded in the recording medium, to extract the divided content data based on the threshold, and to combine the divided content data being extracted to generate combined content data.

The record controlling unit may update the operation data previously recorded in the recording medium in response to a newly-input reproduction operating command. The reproduction operating command may include a reproduction direction instructing operation, reproduction speed instructing operation or zooming operation.

Furthermore, according to another embodiment of the present invention, there is provided a content editing method including the steps of: inputting a reproduction operating command of content data by a user; and recording operation data corresponding to the input reproduction operating command along with a reproduction position of the content data in a recording medium.

Furthermore, according to another embodiment of the present invention, there is provided a program for causing a computer to function as a unit for inputting a reproduction operating command of content data by a user and a unit for recording operation data corresponding to the input reproduction operating command along with a reproduction position of the content data in a recording medium.

According to the present invention, it is possible to easily and rapidly extract a section corresponding to a content data reproducing operation.

BRIEF DESCRIPTION OF THE SEVERAL VIEWS OF DRAWINGS

FIG. 8 is an explanatory diagram showing a data structure and data example of operation log data according to the embodiment;

FIG. 9 is an explanatory diagram showing an example of a score table for scoring the operation log data;

FIG. 12 is a flowchart showing a reproducing section extracting operation of the content editing apparatus according to the embodiment;

FIG. 14 is plan view (partial cross-section view) and side view showing an operation inputting unit according to a second embodiment of the present invention;

FIG. 15 is a side view showing an example of a shape of an inputting unit 31 in the operation inputting unit according to the embodiment before and after loading;

FIG. 28 is an explanatory diagram showing a content editing system according to one embodiment of the present invention.

DETAILED DESCRIPTION OF PREFERRED EMBODIMENTS

Figure 1:
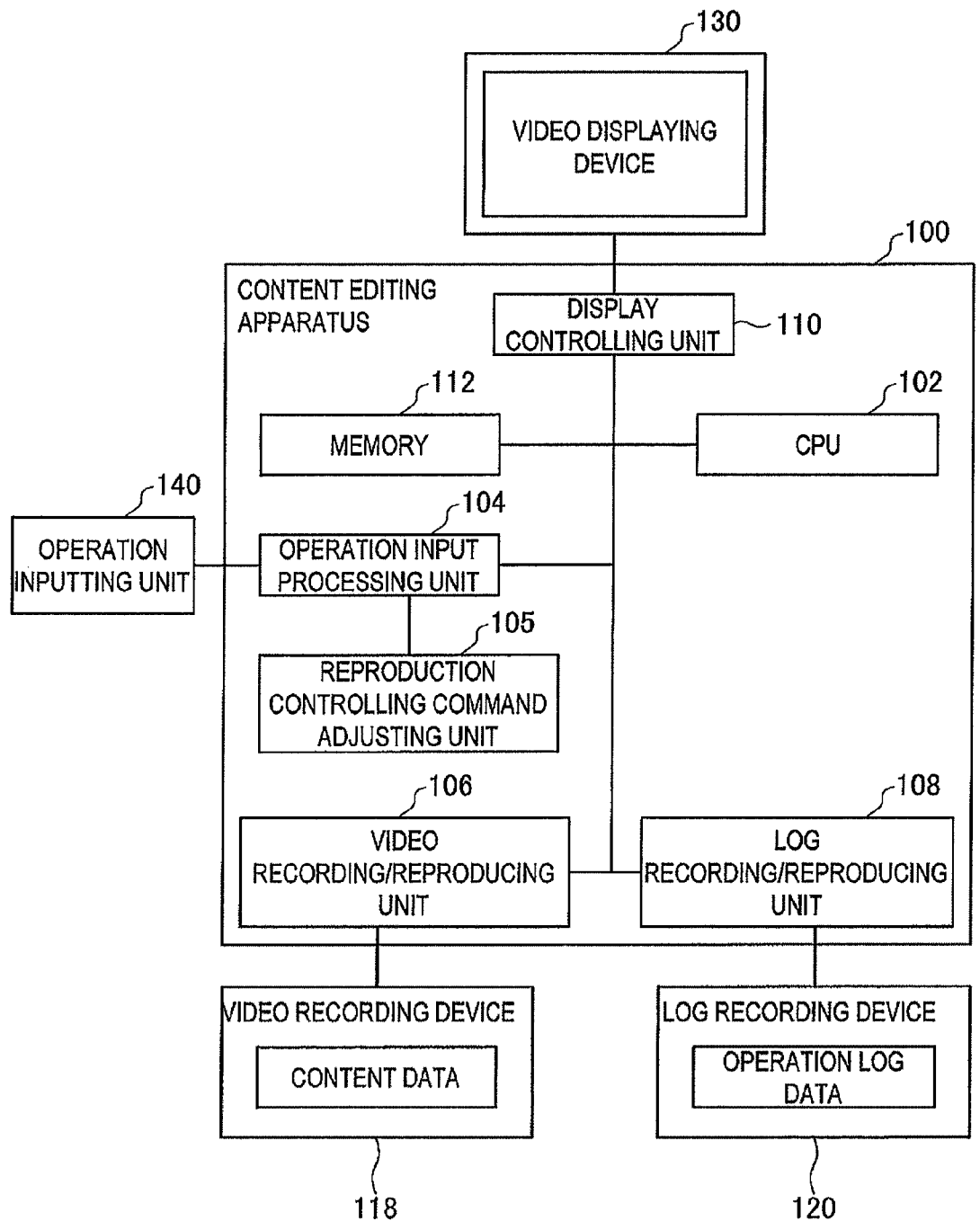
FIG. 1 is a block diagram showing a content editing apparatus according to a first embodiment of the present invention.

Hereinafter, preferred embodiments of the present invention will be described in detail with reference to the appended drawings. Note that, in this specification and the appended drawings, structural elements that have substantially the same function and structure are denoted with the same reference numerals, and repeated explanation of these structural elements is omitted.

(Structure of First Embodiment)

A structure of a content editing apparatus 100 according to a first embodiment of the present invention will be first described. FIG. 1 is a block diagram showing the content editing apparatus 100 according to the present embodiment.

The content editing apparatus 100 extracts sections which meet conditions, for example sections which have high interest degree among content data in response to a user's reproducing operation input via an operation inputting unit 140, reproduces digest data made of the extracted sections or records the same in a recording medium.

The content editing apparatus 100 includes a CPU 102, an operation input processing unit 104, a reproduction controlling command adjusting unit 105, a video recording/reproducing unit 106, a log recording/reproducing unit 108, a memory 112 and the like. The content editing apparatus 100 is connected with a video recording device 118, a log recording device 120, a video displaying device 130, the operation inputting unit 140 and the like. In the present embodiment, there will be described a case where the video recording device 118, the log recording device 120, the video displaying device 130 and the operation inputting unit 140 are separate constituents from the content editing apparatus 100, but the present invention is not limited to the example. For example, the devices may be integrally combined with the content editing apparatus 100.

The CPU (Central Processing Unit) 102 can function as a computing device and a controlling device through programs and control a processing of each constituent provided within the content editing apparatus 100.

The operation input processing unit 104 receives a reproduction operating command from the operation inputting unit 140. The operation input processing unit 104 is connected to the reproduction controlling command adjusting unit 105 and sends a reproduction controlling command generated in the reproduction controlling command adjusting unit 105 to the video recording/reproducing unit 106.

The reproduction controlling command adjusting unit 105 is connected to the operation input processing unit 104 and scores (weights) the user's reproducing operation in response to the reproduction operating command. The reproduction controlling command adjusting unit 105 generates a scored user's reproducing operation as a reproduction controlling command.

The video recording/reproducing unit 106 writes content data in the video recording device 118 or reads out the content data recorded in the video recording device 118. The video recording/reproducing unit 106 generates an operation result based on the reproduction controlling command received from the operation input processing unit 104.

The log recording/reproducing unit 108, which is an example of the record controlling unit, writes operation log data in the log recording device 120 or reads out the operation log data recorded in the log recording device 120. The log recording/reproducing unit 108 generates the operation log data based on the operation result generated in the video recording/reproducing unit 106.

The display controlling unit 110 controls to display content data on the video displaying device 130 in response to the content data. The display controlling unit 110 sends a video signal to the video displaying device 130.

The memory 112 is configured to have a storing unit such as RAM (Random Access Memory), ROM (Read Only Memory) or cache memory. The memory 112 has a function of temporarily storing data on the processing of the CPU 102 or an operation program of the CPU 102.

A series of processings in the content editing apparatus 100 may be processed in hardware or may be realized through a software processing by programs on the computer.

The video recording device 118 stores content data therein. The content data is, for example, video data related to video contents such as videos or still images' slideshow.

The log recording device 120 stores operation log data therein. The operation log data is information such as an operation result corresponding to the user's reproduction operating command and a content data reproduction position at the time of being operated.

The video recording device 118 and the log recording device 120 are configured to have, for example, a HDD (hard disk drive) or flash memory and are directed for storing data for a long time.

The video displaying device 130 is configured to have a displaying unit such as liquid crystal displaying (LCD) device or CRT displaying device for displaying a video signal and an audio outputting unit such as speaker for outputting an audio signal. For example, a user can view content data via the video displaying device 130.

The operation inputting unit 140 is a controller, keyboard, mouse or the like including a plurality of buttons, for example. The operation inputting unit 140 sends a reproduction operating command corresponding to the reproducing operation to the operation input processing unit 104 in response to the user's reproducing operation.

Figure 2:
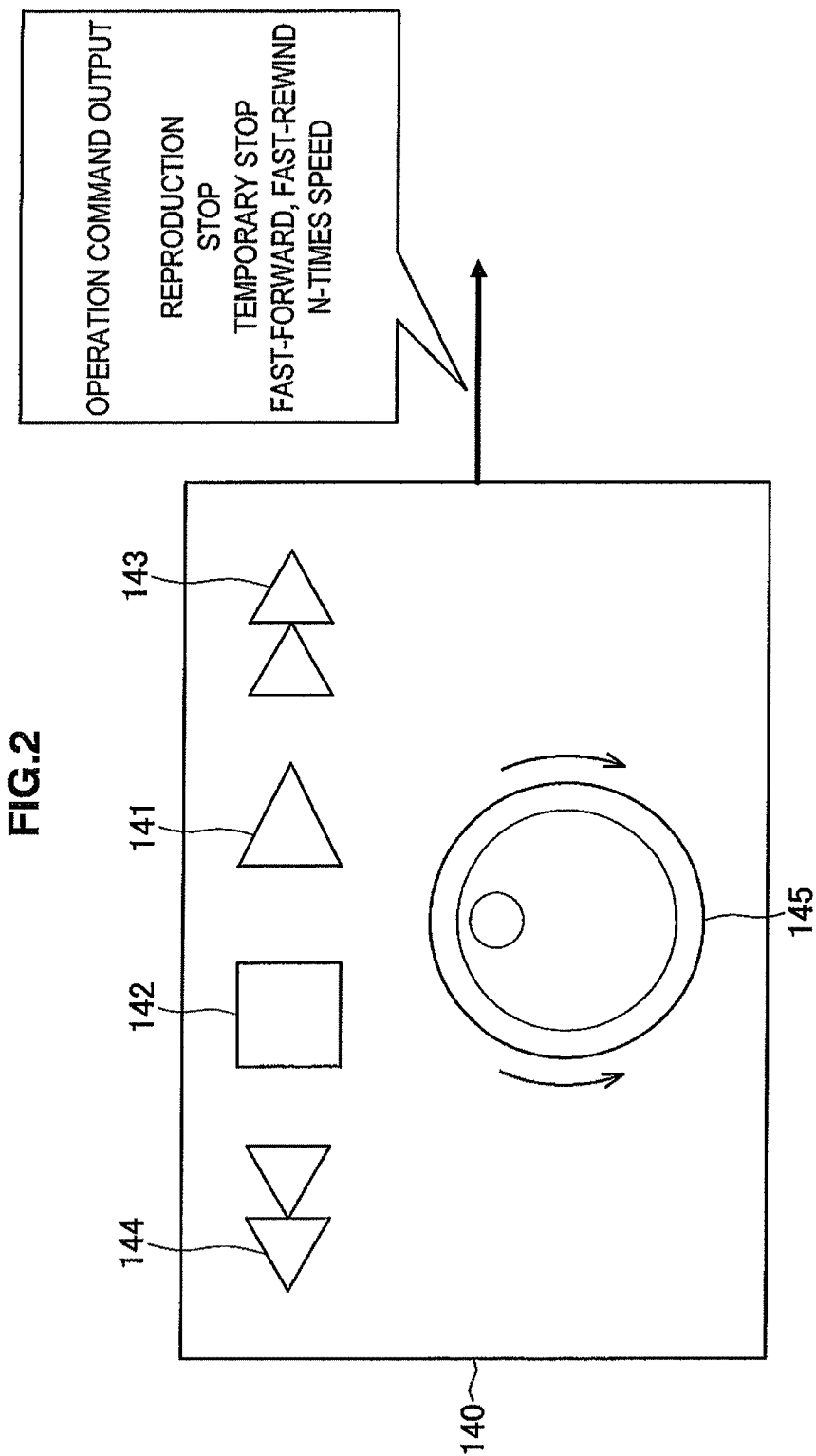
FIG. 2 is a plan view showing an operation inputting unit according to the embodiment.

The operation inputting unit 140 will be described with reference to FIG. 2. FIG. 2 is a plan view showing the operation inputting unit 140 according to the present embodiment. The operation inputting unit 140 is configured to have, for example, a reproduction button 141, a stop button 142, a fast-forward button 143, a fast-rewind button 144, a speed controller 145 and the like.

When the reproduction button 141 is pressed, a reproduction command of instructing to start content data reproducing is output, and when the reproduction button is pressed again during reproducing, a temporary stop command of instructing to temporarily stop content data reproducing is output.

When the stop button 142 is pressed, a stop command of instructing to stop content data reproducing is output.

Further, when the fast-forward button 143 is pressed, a fast-forward command of instructing to reproduce content data in the forward direction faster than the standard reproduction speed is output. When the fast-rewind button 144 is pressed, a fast-rewind command of instructing to reproduce content data in the reverse direction faster than the standard reproduction speed is output.

The speed controller 145 can adjust the reproduction speed at an arbitrary speed faster or slower than the standard reproduction speed and arbitrarily select the reproduction direction in the forward or reverse direction. The speed controller 145 is adjusted to output a command of instructing the reproduction speed or reproduction direction.

Each constituent of the content editing apparatus 100 according to the present embodiment will be described below in detail.

Figure 3:
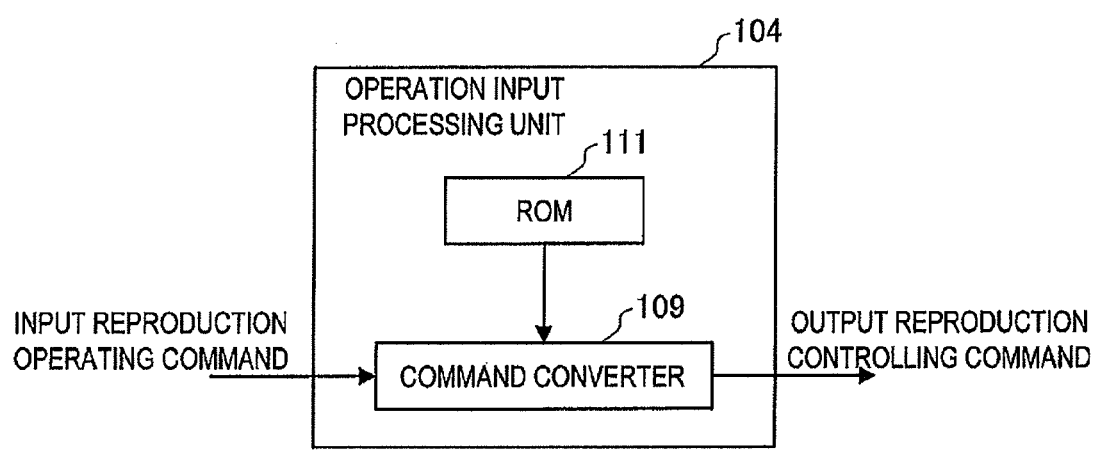
FIG. 3 is a block diagram showing an operation input processing unit according to the embodiment.

The operation input processing unit 104 will be first described with reference to FIG. 3. FIG. 3 is a block diagram showing the operation input processing unit 104 according to the present embodiment.

The operation input processing unit 104 is configured to have, for example, a command converter 109, a ROM 111 and the like.

The command converter 109 receives the reproduction operating command output from the operation inputting unit 140 and refers to a table recorded in the ROM 111 based on the reproducing command to generate the reproduction controlling command. The command converter 109 sends the generated reproduction controlling command to the video recording/reproducing unit 106.

The ROM 111 holds a table for converting the reproduction operating command into the reproduction controlling command. The table is read out by the command converter 109.

Figure 4:
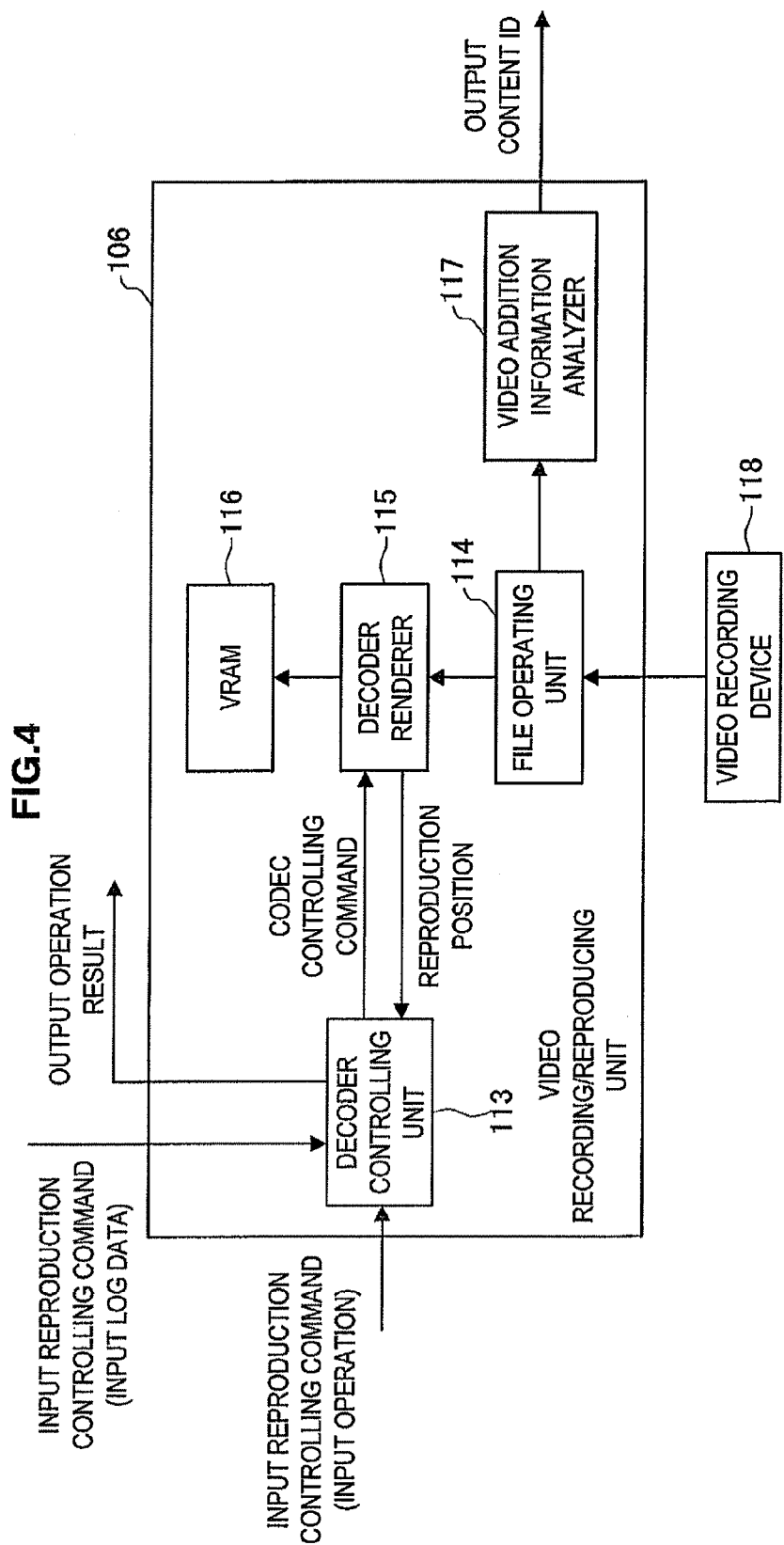
FIG. 4 is a block diagram showing a video recording/reproducing unit according to the embodiment.

The video recording/reproducing unit 106 will be described below with reference to FIG. 4. FIG. 4 is a block diagram showing the video recording/reproducing unit 106 according to the present embodiment.

The video recording/reproducing unit 106 is configured to have, for example, a decoder controlling unit 113, a file operating unit 114, a decoder renderer 115, a VRAM 116, a video addition information analyzer 117 and the like.

The decoder controlling unit 113 receives a reproduction controlling command from the operation input processing unit 104, similarly receives a reproduction controlling command from the log recording/reproducing unit 108 and sends a CODEC controlling command to the decoder renderer 115 to control the operation of the decoder renderer 115. Thus, the sections extracted from the content data, which meet certain conditions, are reproduced.

The decoder controlling unit 113 receives information on a reproduction position from the decoder renderer 115 to generate an operation result and sends the generated operation result to the log recording/reproducing unit 108. The operation result includes commands, time codes at the time of generating the command and the like, for example. Thus, new operation log data is generated by a new reproducing operation.

The file operating unit 114 reads out content data from the video recording device 118 and sends the read content data to the decoder renderer 115 and the video addition information analyzer 117.

The decoder renderer 115 performs decoder processing and renderer processing on the content data received from the file operating unit 114. The data processed by the decoder renderer 115 is sent to the VRAM 116. Further, the decoder renderer 115 sends information on a reproduction position of the section reproduced through the reproducing operation to the decoder controlling unit 113.

The VRAM 116 stores the content data which has been subjected to the decoder processing and the renderer processing therein.

The video addition information analyzer 117 extracts a content ID (identification information) from the content data and sends the content ID to the log recording/reproducing unit 108.

Figure 5:
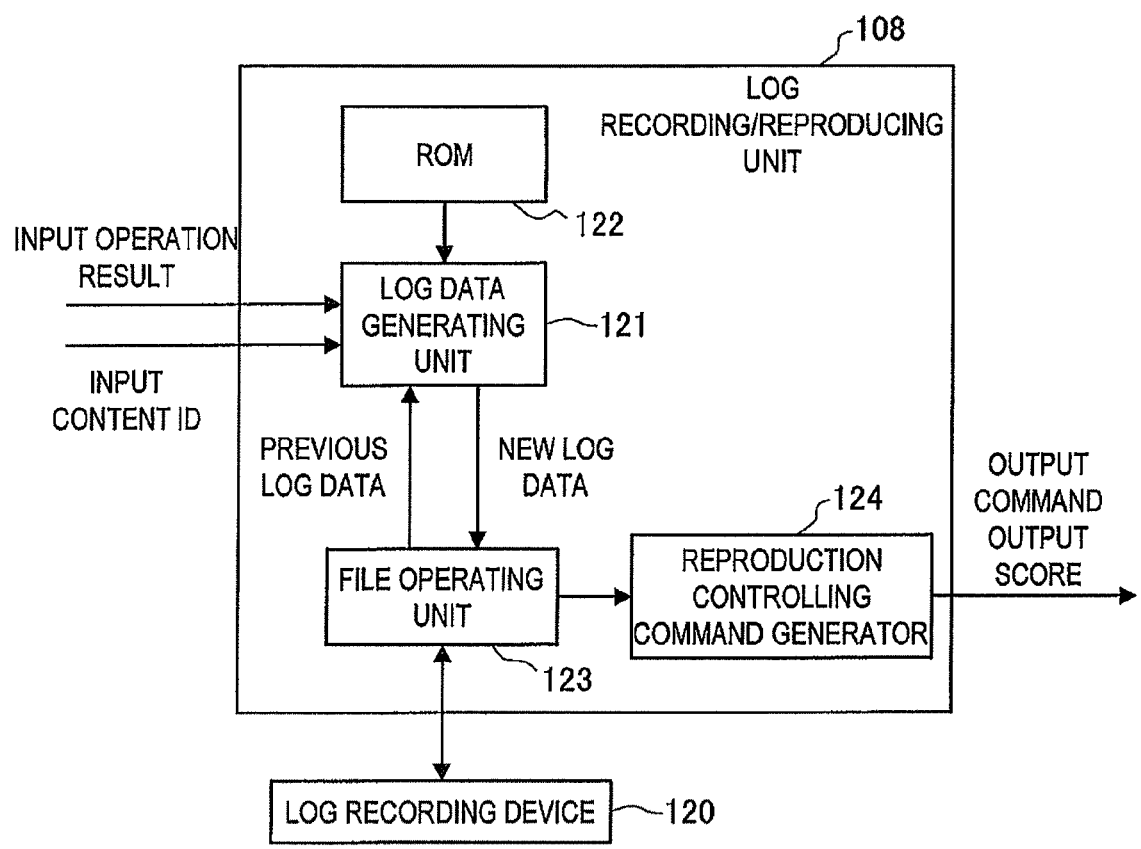
FIG. 5 is a block diagram showing a log recording/reproducing unit according to the embodiment.

The log recording/reproducing unit 108 will be described below with reference to FIG. 5. FIG. 5 is a block diagram showing the log recording/reproducing unit 108 according to the present embodiment.

The log recording/reproducing unit 108 is configured to have, for example, a log data generating unit 121, a ROM 122, a file operating unit 123, a reproduction controlling command generator 124 and the like.

The log data generating unit 121 receives the operation result and the content ID from the video recording/reproducing unit 106. Then the log data generating unit 121 receives the previous log data already stored in the log recording device 120 from the file operating unit 123 and performs scoring based on the score table stored in the ROM 122 to generate new log data. The log data generating unit 121 sends the generated new log data to the file operating unit 123.

The ROM 122 stores the score table therein in response to the operation of the reproduction speed or the reproduction direction at the time of reproducing the content data.

The file operating unit 123 receives new log data from the log data generating unit 121 and writes the operation log data into the log recording device 120. The file operating unit 123 reads out the operation log data recorded in the log recording device 120 and sends the read operation log data to the log data generating unit 121 and the reproduction controlling command generator 124.

The reproduction controlling command generator 124 receives log data from the file operating unit 123 and generates a reproduction controlling command and score information based on the log data. The reproduction controlling command generator 124 sends the generated reproduction controlling command and the score information to the video recording/reproducing unit 106 and the reproduction controlling command adjusting unit 105. Thus, when reproduction is performed based on the log data, the sections which meet certain conditions based on the score information can be extracted.

Figure 6:
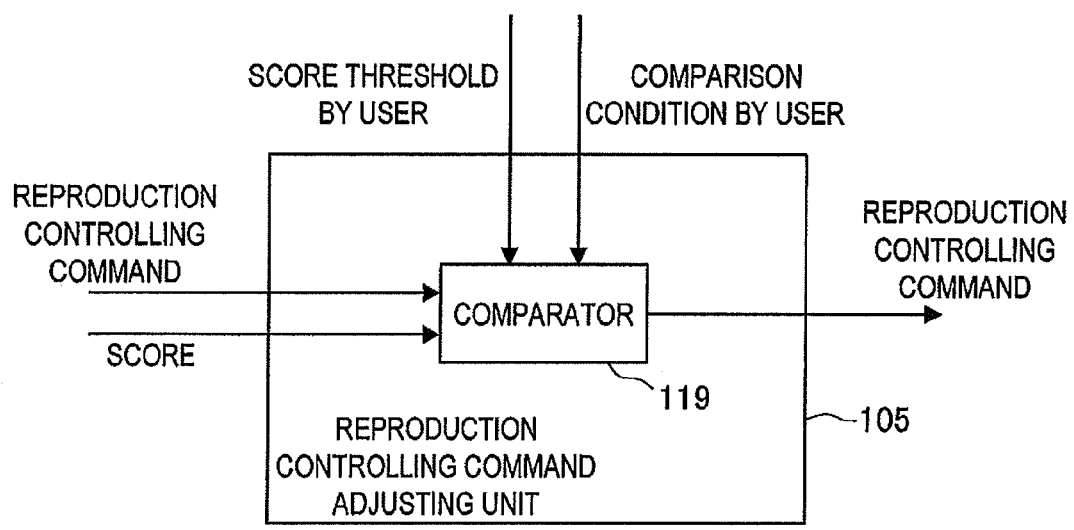
FIG. 6 is a block diagram showing a reproduction controlling command adjusting unit according to the embodiment.

The reproduction controlling command adjusting unit 105 will be described below with reference to FIG. 6. FIG. 6 is a block diagram showing the reproduction controlling command adjusting unit 105 according to the present embodiment.

The reproduction controlling command adjusting unit 105 has a comparator 119 and the like, for example.

The comparator 119 receives a reproduction controlling command and score information from the log recording/reproducing unit 108. The comparator 119 receives a threshold of a user-input score and user-input comparison conditions. The comparison conditions are to select a section whose score is equal to the threshold of the score among the content data, or to select a section whose score is larger or smaller than the threshold of the score. The comparator 119 newly generates a reproduction controlling command based on the reproduction controlling command and score information input from the log recording/reproducing unit 108, the user-input threshold and the comparison conditions.

Thus, content data can be reproduced for the sections which meet certain conditions based on the score information.

(Operation of First Embodiment)

An operation of the content editing apparatus 100 according to the first embodiment of the present invention will be described below.

Figure 7:
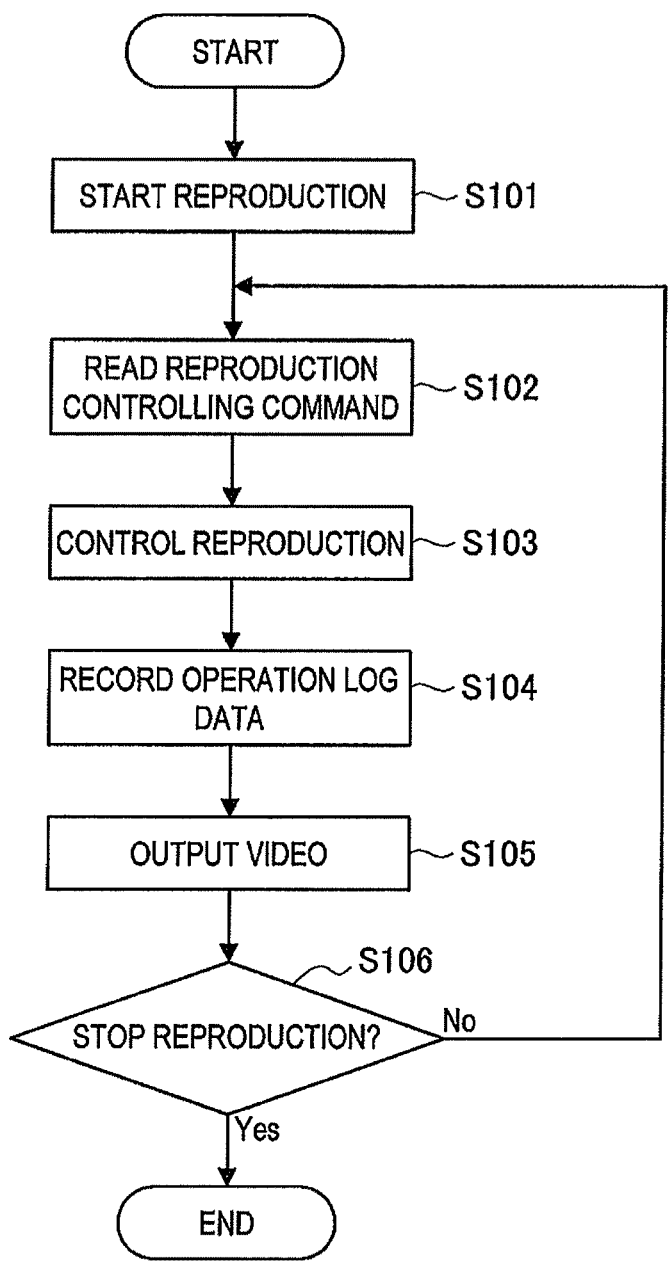
FIG. 7 is a flowchart showing an operation during content data reproducing.

An operation of reproducing and viewing content data will be first described. FIG. 7 is a flowchart showing the operation at the time of reproducing content data.

The selected content data is started to reproduce through the user's operation of the operation inputting unit 140 (step S101). Then, an operation command is converted into a reproduction controlling command in the operation input processing unit 104 and the reproduction controlling command is read for each frame of the content data in the video recording/reproducing unit 106 (step S102). At this time, the commands such as reproduction speed, reproduction direction or zooming operation are read.

Next, the video recording/reproducing unit 106 performs reproducing control of the content data read out from the video recording device 118 based on the reproduction controlling command (step S103). At this time, the video recording/reproducing unit 106 sends an operation result to the log recording/reproducing unit 108 and the log recording/reproducing unit 108 records the operation log data in the log recording device 120 (step S104).

The video recording/reproducing unit 106 sends to the display controlling unit 110 the content data which has been subjected to the decode processing and the renderer processing and the display controlling unit 110 displays a video of the content data on the video displaying device 130 (step S105). Then, the operations from step S101 to step S105 are repeated until the content data reproducing stop is instructed by the user's operation of the operation inputting unit 140 (step S106).

The operation log data recorded in the log recording device 120 will be described here. FIG. 8 is an explanatory diagram showing a data structure and data example of the operation log data according to the present embodiment.

A format of the operation log data is divided into, for example, a header and a log part as shown in FIG. 8A. As shown in FIGS. 8A and 8B, the header is configured to include unique log ID (log_id), content ID (conte_id), user ID (user_name), generating time (date) and the like. Further, the log part is configured to include a plurality of logs for each reproduction controlling by user's operation. Each log is configured to include an index representing the control order, control starting position (time), content reproduction state based on the control result (speed, zoom_center, zoom_scale) and the like. The content reproduction state includes a reproduction speed or a zoom state, for example, when reproducing the content data.

For example, in the example shown in FIG. 8B, reproduction starts at 1-time speed (standard reproduction speed) at 0 second and is controlled to be at 0.5-time speed at 1 minute 2 seconds and 1-time speed in the reverse direction at 4 minutes 30 seconds. The reproduction is being performed at 1-time speed at 4 minutes 56 seconds while double zooming is performed in which the center is moved to 50th pixel and 70th pixel in the horizontal direction and vertical direction, respectively. Thereafter, the content data reproduction is stopped at 10 minutes.

The operation log data is recorded for each content data each time the content data is reproduced. The operation log data is read to perform scoring based on a certain rule and to apply a threshold, thereby extracting sections which meet the certain condition. Consequently, the extracted sections are combined, thereby generating the digest content data.

The content data may be reproduced by using the reproduction speed or zoom magnification recorded in the operation log data when reproducing the content data, and performing the same reproduction controlling as the operation recorded in the operation log data. Thus, when the digest content data is reproduced, more effective reproduction of the sections with high interest degree can be performed.

Next, an example of rule for scoring the operation log data will be described with reference to FIG. 9. FIG. 9 is an explanatory diagram showing an example of a score table for scoring the operation log data. FIG. 9A shows a relationship between reproduction speed and score and FIG. 9B shows a relationship between zoom magnification and score. A score of a certain section is calculated based on the reproduction speed and the zoom magnification.

In FIG. 9, for example, when a score of a certain section is assumed as an index of interest degree of the section, scoring is performed depending on the user's interest degree. In other words, in the case of the reproduction speed shown in FIG. 9A, the slower the reproduction is performed, the higher the interest degree is, and the faster the section is forwarded or rewound, the lower the interest degree is. When the standard reproduction speed is set at V=1, if the reproduction speed is in the range of $-1 \leq V \leq 1$, the core is assumed as 1, if the reproduction speed is in the range of V<−1 or 1<v≤2, the score is assumed as 0, and if the reproduction speed is in the range of v>2, the score is assumed as −1.

Further, in the case of the zoom magnification shown in FIG. 9B, the section which is enlarged for reproduction has high interest degree. When the standard size is set at z=1, if the zoom magnification is in the range of z≤0, the score is assumed as 0, and if the zoom magnification is in the range of z>1, the score is assumed as 1.

Figure 10:
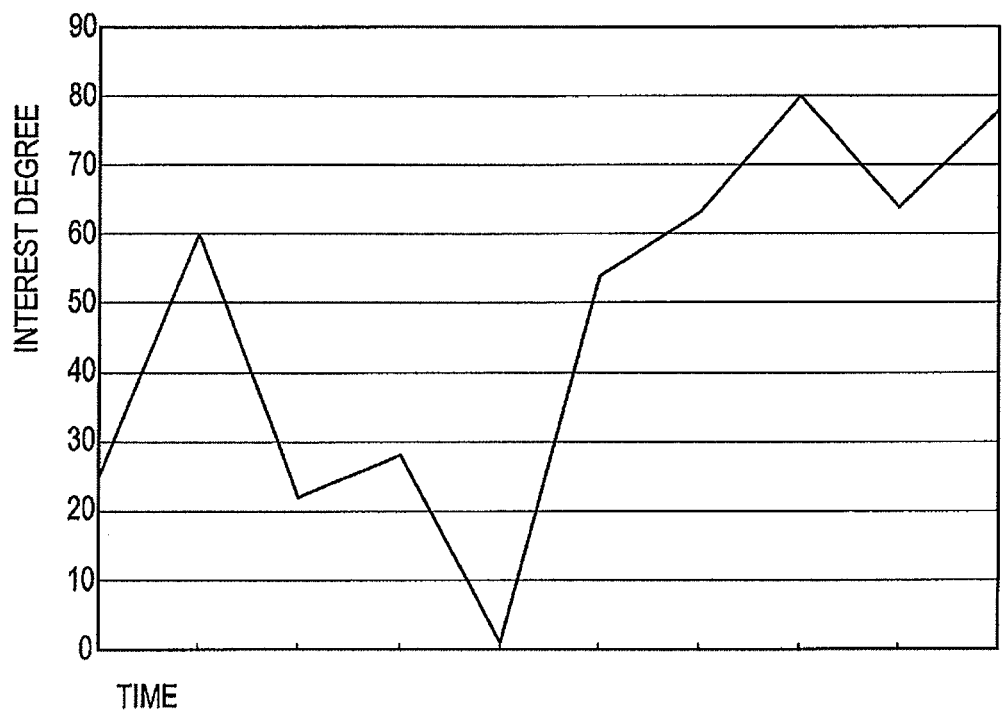
FIG. 10 is a graph showing a relationship between interest degree and time.

When the above operation log data and the score table shown in FIG. 9 are used, the interest degree distribution on the time axis can be obtained as shown in FIG. 10. FIG. 10 is a graph showing a relationship between interest degree and time. The interest degree changes in the time axis direction depending on the operation such as reproduction speed or zoom magnification. As for the interest degree distribution, when a plurality of items of operation log data are recorded for each reproduction, the calculation is performed by averaging so that the interest degree distribution with higher accuracy can be obtained.

Figure 11:
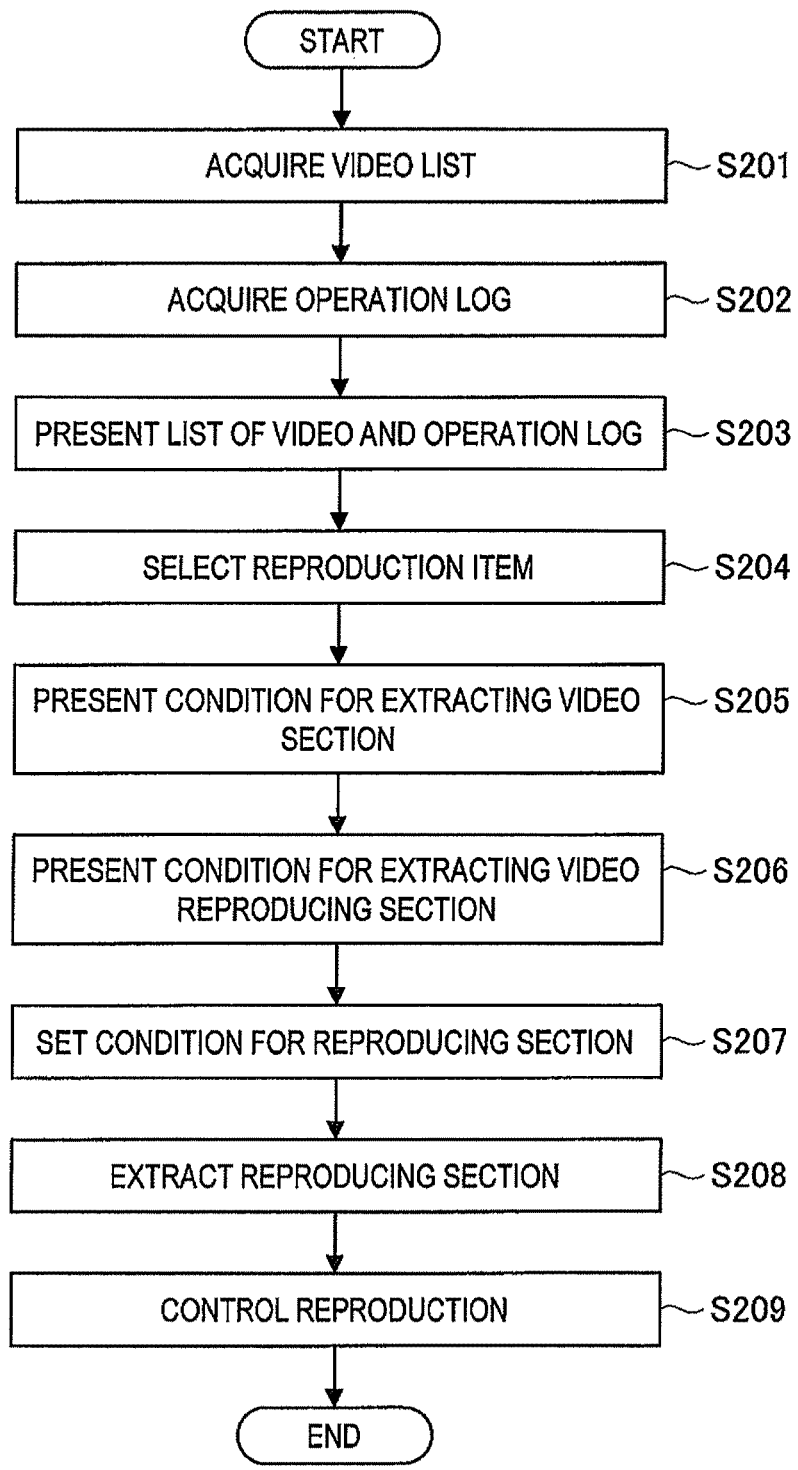
FIG. 11 is a flowchart showing an editing processing operation of the content editing apparatus according to the embodiment.

An edition processing operation of the content editing apparatus 100 according to the present embodiment will be described below with reference to FIG. 11. FIG. 11 is a flowchart showing the edition processing operation of the content editing apparatus 100 according to the present embodiment.

At first, when a plurality of items of content data such as several videos are recorded in the video recording device 118, the content editing apparatus 100 acquires a video list from the video recording device 118 (step S201). Further, the content editing apparatus 100 acquires operation log data from the log recording device 120 (step S202).

Next, the content editing apparatus 100 presents a list of videos and operation logs to the user via the video displaying device 130 based on the acquired video list and operation log data (step S203). Then, the user selects a video to be reproduced (reproduction item) (step S204).

Once the video to be reproduced is selected, the graph showing the relationship between interest degree and time as shown in FIG. 10 is presented to the user via the video displaying device 130 based on the operation long data corresponding to the selected video (step S205). Thus, if the selected video has been previously reproduced, the user can easily determine which section among the video data has high or low interest degree.

Next, a threshold of the interest degree is displayed on the video displaying device 130 so that the sections are divided into the sections with high interest degree and the sections with low interest degree (step S206). The threshold of the interest degree can be raised or lowered by the user and the threshold is set by the user, thereby setting the reproducing section condition (step S207).

Once the threshold is set, the content editing apparatus 100 extracts the sections with high interest degree as the sections to be reproduced, for example (step S208). Thus, only the sections with high interest degree among the video data are combined or reproduced so that the digest video data is generated. For example, when the user performs reproduction starting operation, the content editing apparatus 100 performs reproduction controlling to reproduce the extracted sections with high interest degree (step S209). Though not shown, when the user operates to start digest file generation, the content editing apparatus performs file generation to record a newly-generated file in the recording medium.

There will be described in detail a reproducing section extracting operation among the edition processing operations of the content editing apparatus 100 according to the present embodiment with reference to FIGS. 12 and 13. FIG. 12 is a flowchart showing the reproducing section extracting operation of the content editing apparatus 100 according to the present embodiment. FIG. 13 is a graph showing a relationship between interest degree and time, where a threshold is indicated.

Figure 13A:
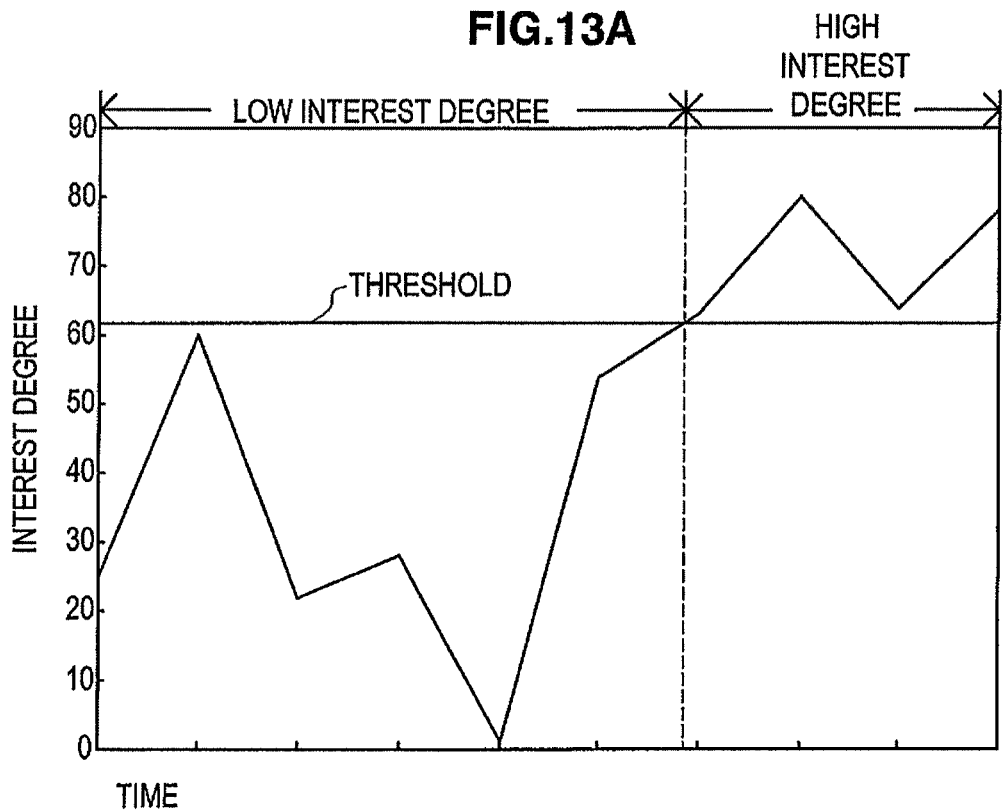
FIG. 13 is a graph showing a relationship between interest degree and time.
Figure 13B:
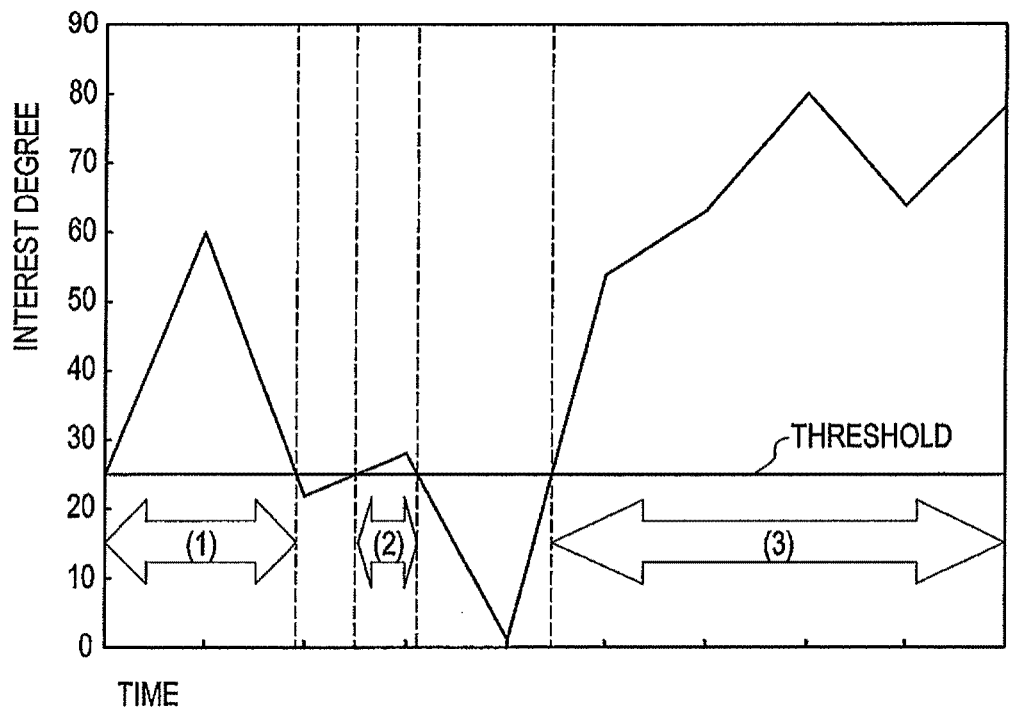

At first, an interest degree distribution in the time axis direction is calculated based on the operation log data and the score table (step S301). Consequently, the graph as shown in FIG. 13A or 13B is obtained. Next, a threshold is designated by which the sections are divided into the sections with high interest degree and the sections with low interest degree (step S302). When a similar graph as shown in FIG. 13A is displayed in the video displaying device 130, the position of the threshold is raised or lowered by the user, for example, a line indicating the threshold is dragged by the mouse to arbitrarily set the sections with high interest degree as the sections to be reproduced (step S303). For example, as shown in FIG. 13B, the sections with high interest degree can be selected as three sections.

When the original data combines the sections separated as in the sections (1), (2) and (3) in FIG. 13B, a cross-fade method may be used to combine the sections.

The cross-fade is a combining method which is used for the transparency of the previous and following videos for several seconds and is for gradually making the transparency of the previous video opaque to completely transparent and gradually making the following video from completely transparent to opaque. When black fade is used, the tail and the header of the target section are mixed. Thus, when one wishes to reliably view the sections with high interest degree to the end or from the beginning, the extended sections with high interest degree need to be extracted in consideration of the cross-fade period.

For example, in order to extract the cross-fade period, a threshold lower than the user-set threshold is set and the threshold for the cross-fade is applied to extract the cross-fade period (step S304).

Then, the content editing apparatus 100 combines the extracted sections with high interest degree and the extracted cross-fade period (step S305). Consequently, the combined reproduction data in which each section is combined is generated (step S306).

The combined reproduction data is recorded in the recording medium or displayed on the video displaying device 130 as it is (step S307). For example, the sections (1), (2), (3) and the previous and following short periods of the (1), (2), (3) are combined in FIG. 13B and the video data is sequentially reproduced on the order of (1), (2), (3) while including the cross-fade period.

As described above, according to the present embodiment, when content data is reproduced and viewed, the operation log data such as reproduction speed or zoom magnification is recorded so that the sections with high interest degree among the content data can be extracted. The sections with high interest degree are utilized so that file generation of digest content data is performed rapidly and easily.

The interest degree distribution in the time axis direction and the threshold are visibly displayed on the video displaying device 130 so that the user can easily change the threshold and the digest having a user-desired length can be easily generated.

The operation log data is recorded for each reproduction so that the accuracy of the interest degree distribution to be calculated can be improved. Further, content data may be reproduced by utilizing the reproduction speed or zoom magnification recorded in the operation log data when reproducing the content data to perform the same reproduction controlling as the operation recorded in the operation log data. Thus, when the digest content data is reproduced, more effective reproduction of the sections with high interest degree can be performed.

(Second Embodiment)

A content editing apparatus 200 according to a second embodiment of the present invention will be described below. The content editing apparatus 200 according to the present embodiment has the similar structure as the first embodiment shown in FIG. 1 except that the present embodiment has an operation inputting unit 240 described later instead of the operation inputting unit 140. Other constituents of the content editing apparatus 200 have the similar structure and operations as the apparatus 100 and the detailed description thereof will be omitted.

The operation inputting unit 240 is configured to include an inputting unit 31 which a user's finger or object contacts and which is made of deformable material, a fixing unit 32 for supporting the inputting unit 31, and an external connecting unit 33 into/from a power supply or control signal is input/output.

The operation inputting unit 240 is configured to have a stress magnetic field converting unit 41 (magnetic body) having flexibility and predetermined surface friction. The stress magnetic field converting unit 41 (magnetic body) changes into various shapes due to a force applied from an external object and a shape of the object. A bias magnetic flux which has been initially given to the stress magnetic field converting unit 41 (magnetic body) changes correspondingly to the deformation of the stress magnetic field converting unit 41 (magnetic body). The change in the bias magnetic flux is detected as a change in voltage through a magnitude of the magnetic flux density or a directional change in the magnetic flux density for informatization. The change in voltage is corresponded to various reproduction operating commands (such as reproduction start or stop, reproduction direction, reproduction speed) depending on its kind, and the operation inputting unit 240 sends a reproduction operating command corresponding to the change in voltage to the operation input processing unit 104.

A structure of the operation inputting unit 240 according to the present embodiment will be described below with reference to FIG. 14. FIG. 14 is a plan view (partial cross-section view) and side view showing the operation inputting unit 240 according to the present embodiment. There is shown at the upper side of FIG. 14a a top view where the operation inputting unit 240 is viewed from immediately above and at the lower side of FIG. 14 a side cross-section view where the operation inputting unit 240 is viewed from side.

The inputting unit 31 is broadly configured to have the stress magnetic field converting unit 41 and the magnetic field detecting unit 42. On the top view of FIG. 14, the stress magnetic field converting unit 41 is omitted for convenient description.

The stress magnetic field converting unit 41 is made of a composite material (also called viscoelastic magnet below) of viscoelastic material such as silicon gel and rare-earth magnetic powder and easily deforms due to external load. The magnetic field detecting unit 42 is configured to have a circuit board where one or more magnetoelectric transducer such as hall element are arranged, and detects a magnetic flux generated from the surface of the adjacent stress magnetic field converting unit 41 to output a voltage.

An example of a shape of the inputting unit 31 in the operation inputting unit 240 before and after loading will be described below with reference to FIG. 15. FIG. 15 is a side view showing an example of the shape of the inputting unit 31 in the operation inputting unit 240 according to the present embodiment before and after loading. The inputting unit 31 can easily deform into various shapes due to external load since the stress magnetic field converting unit 41 configuring the inputting unit 31 is made of a viscoelastic material in which viscoelastic elastomer is used as binder as described above. Silicon gel with high heat resistance, cold resistance, slidability and wear resistance is suitable for the viscoelastic material but other materials may also be used.

A boundary between the inputting unit 31 and the fixing unit 32 is a constraint surface 51, which is affixed through bonding or integral molding. Thus, when a load F is applied to the inputting unit 31 through finger A's pressing of the inputting unit 31, a so-called bulging phenomenon occurs, where the inputting unit 31 after loading expands in part of the side or top surface more than in the original shape before loading, from incompressibility similar to those of rubber material or the like. It is seen by the applicant as an experimental result that the deformation shape expresses various characteristics due to loading value or input shape.

The materials configuring the inputting unit 31 will be described below in detail with reference to FIG. 14.

In the example of FIG. 14, the magnetic field detecting unit 42 is configured to have a circuit board 61 in which one or more magnetoelectric transducer such as hall element are arranged and which is molded by a resin 62, and is bonded on the fixing unit 32 to be fixed.

The stress magnetic field converting unit 41 is bonded on the circuit board 61 molded by the resin 62. In the example of FIG. 14, the stress magnetic field converting unit 41 is configured to have a viscoelastic magnet 63 which is shaped by kneading typical magnet material and viscoelastic material, and a thin-film silicon rubber 64 integrated therewith by two-color molding.

The magnet material includes, for example, neodymium-based or samarium-based rare-earth or ferrite magnetic powder material. The viscoelastic material includes silicon or polyurethane.

Since the viscoelastic material typically has higher viscosity as it becomes softer, when it is assumed that the material contacts an object grip or person, the material needs to be modified through coating or powder processing, thereby reducing friction. However, since the material has low durability and is likely to change in its surface state in use environment, the surface may be uneven and a positional characteristic difference may occur in the surface of the operation inputting unit 240 depending on the modifying method.

Thus, the thin-film silicon rubber 64 is integrated with the surface of the viscoelastic magnet 63 to configure the stress magnetic field converting unit 41 as shown in FIG. 14. Consequently, the thin-film silicon rubber 64 on the surface allows durability improvement and friction control without losing softness of the inside silicon gel (or of the viscoelastic magnet 63).

A bias magnetic field applied to the stress magnetic field converting unit 41 before and after loading will be described below with reference to FIG. 15. FIG. 15 is a side view showing an example of the bias magnetic field applied to the stress magnetic field converting unit 41 before and after loading. Actually, the stress magnetic field converting unit 41 also deforms after loading similarly as the inputting unit 31, but the stress magnetic field converting unit 41 after loading in FIG. 15 is shown as having the same shape as before loading for convenient description.

The stress magnetic field converting unit 41 is made of, as described above with reference to FIG. 14, an isotropic rare-earth magnet (that is, viscoelastic magnet 63) with viscoelasticity which is mixed with elastomer as a binder to be shaped. The rare-earth magnet may be anisotropic. The stress magnetic field converting unit 41 has been previously applied a bias magnetic field B in the z-axis direction (in the vertical direction relative to the input plane 31a) by magnetization after being shaped as shown by an arrow before loading.

Meanwhile, after a load F is applied through the finger A's pressing of the inputting unit 31, the intensity of the bias magnetic field B, which has been arranged in the z-axis direction before loading, causes a difference (varies) due to deformation of the stress magnetic field converting unit 41, and then becomes a magnetic field depending on the material thickness. In other words, as shown by the arrow's length after loading, the bias magnetic field B of a portion where the thickness is made larger due to bulging phenomenon becomes stronger than before loading, and the bias magnetic field B of a portion where the thickness is made smaller due to a load F becomes weaker than before loading.

This is based on a change in a diamagnetic field inside the magnet along with a change in the thickness of the stress magnetic field converting unit 41 (that is, rare-earth magnet). The smaller the thickness is, the larger the diamagnetic field inside the magnet becomes, thereby making the magnetic flux density occurring outside the magnet smaller (not shown). In other words, the stress magnetic field converting unit 41 correlates with the magnetic flux density.

A stress which occurs inside the magnet due to the object's load F correlates with the deformation of the stress magnetic field converting unit 41 (that is, viscoelastic material). Therefore, a magnetic flux vector occurring outside the magnet closely correlates with the stress occurring inside the magnet due to the object's load F.

There is described an example where the bias magnetic field B is applied substantially in the z-axis direction in the example of FIG. 15, but the direction in which the bias magnetic field B is applied is not limited to the z-axis direction. For example, the bias magnetic field B may be applied in a different direction (such as in a direction tilted by 45 degrees or 90 degrees relative to the z-axis direction) depending on the shapes of various magnets or an arrangement of sensors for detecting a magnetic flux density occurring outside the magnet.

Figure 16:
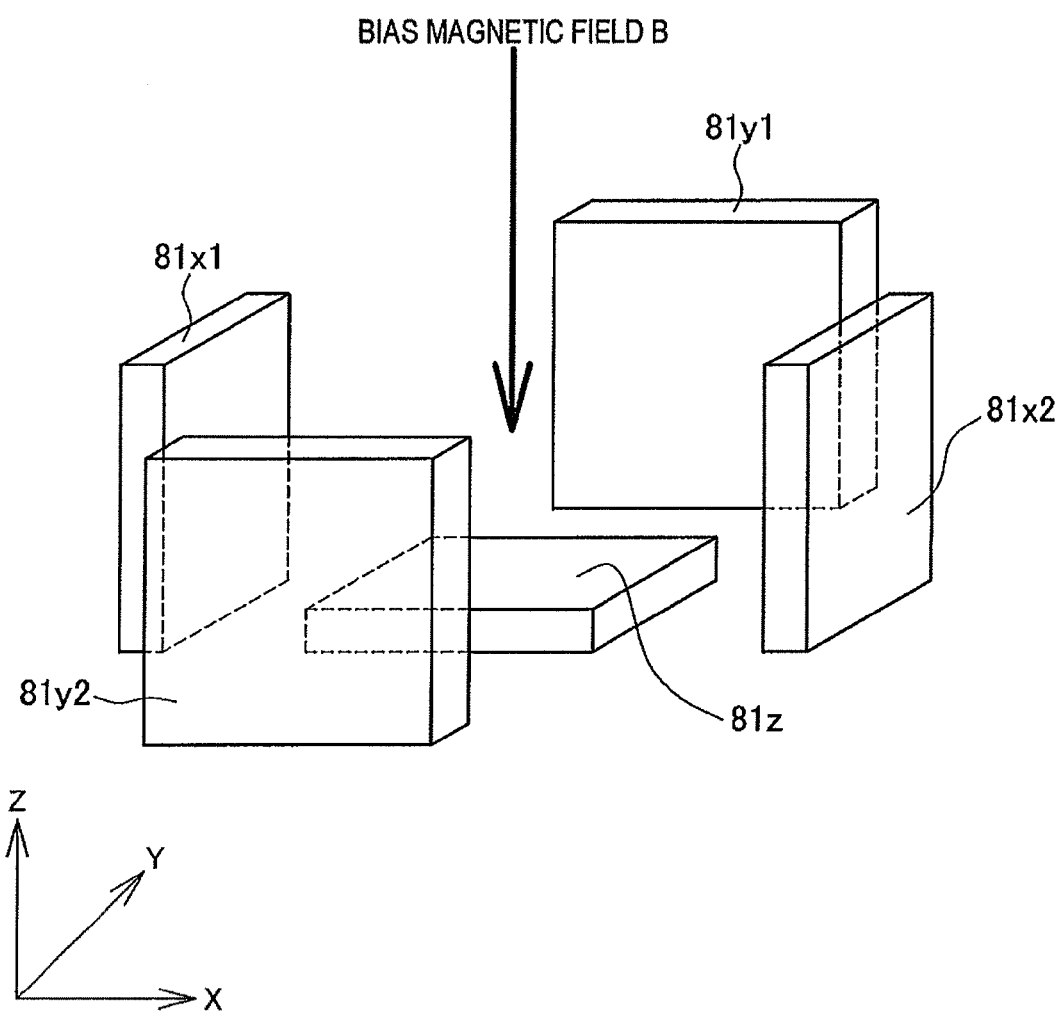
FIG. 16 is a perspective view showing an arrangement example of hall elements of the three axes on a circuit board relative to a bias magnetic field B applied in the z-axis direction.

Three axial hall elements on the circuit board 61 will be described below with reference to FIG. 16. FIG. 16 is a perspective view showing an arrangement example of the hall elements of the three axes on the circuit board 61 relative to the bias magnetic field B applied in the z-axis direction.

In the example of FIG. 16, there is shown a hall element group 91 made of x-axis hall elements 81x1, 81x2, y-axis hall elements 81y1, 81y2 and a z-axis hall element. In other words, in the hall element group 91, two hall elements 81x1 and 81x2 and two hall elements 81y1 and 81y2 are used for the x-axis and the y-axis, respectively.

The z-axis hall element 81z is arranged such that a z-axis magnetic flux $B_d(z)$ to be captured (the z-axis vector among the magnetic flux density vectors $B_d$ decomposed in three axial directions) is substantially parallel to the direction in which the basis magnetic field B is applied. In other words, the z-axis hall element 81z is arranged vertically relative to the bias magnetic field B applied in the z-axis direction. The x-axis hall elements 81x1 and 81x2 are arranged such that their centers are positioned on the z-axis for being used for differential (differential amplifying unit 161 in FIG. 21). The y-axis hall elements 81y1 and 81y2 are arranged such that their centers are positioned on the z-axis for being used for differential.

The hall element group 91, as shown in FIG. 16, may use a structure where five hall elements 81 are united into one semiconductor other than a structure where five single-axis hall elements 81 are used. A composite type structure may be used in which any of the five elements are united and the remaining thereof are configured with single-axis elements.

Figure 17:
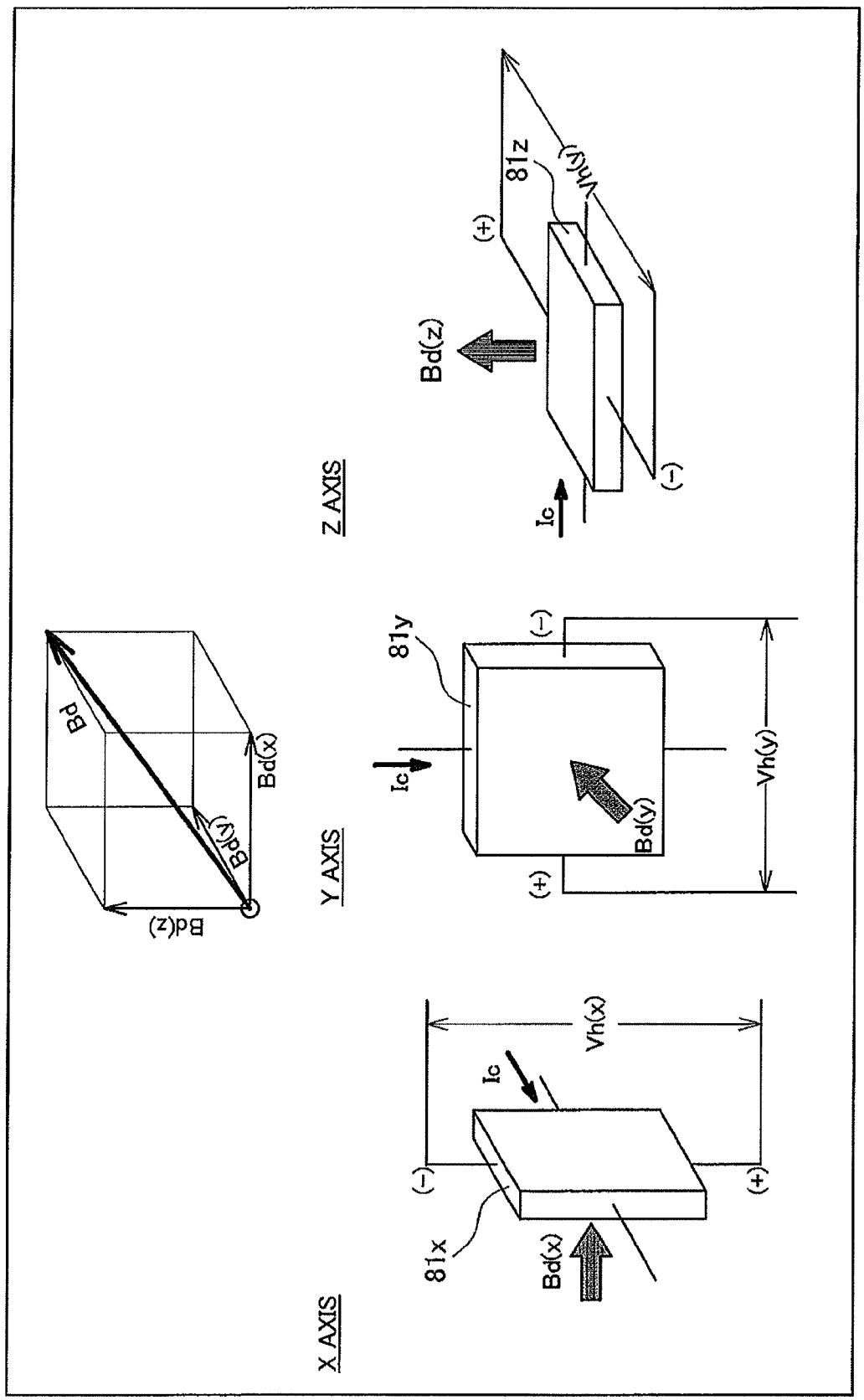
FIG. 17 is a perspective view showing an example of the hall elements of the three axes for detecting a magnetic flux density in three axial directions.

Three axial hall elements according to the present embodiment will be described below with reference to FIG. 17. FIG. 17 is a perspective view showing an example of the hall elements of the three axes for detecting the magnetic flux density in three axial directions.

In the example of FIG. 17, there are shown magnetic flux $B_d(x)$, magnetic flux $B_d(y)$ and magnetic flux $B_d(z)$ which are generated by decomposing the magnetic flux density vector (simply referred to as magnetic flux below) in the x-axis, y-axis and z-axis directions. When a hall current Ic is flowed to the hall element 81x which captures the x-axis magnetic flux $B_d(x)$ (referred to as x-axis hall element 81x below), the hall element 81x captures the magnetic flux $B_d(x)$ in the vertical direction. Then the hall element 81x generates a hall voltage $V_h(x)$ in directions orthogonal to the current direction and magnetic field direction, respectively. In other words, the hall element 81x can capture and convert the magnetic flux $B_d(x)$ into the hall voltage $V_h(x)$.

Similarly, when the hall current Ic is flowed to the hall element 81y which captures the y-axis magnetic field $B_d(y)$ (referred to as y-axis hall element 81y below), the hall element 81y captures the magnetic flux $B_d(y)$ in the vertical direction. Then the hall element 81y generates a hall voltage $V_h(y)$ in directions orthogonal to the current direction and magnetic field direction, respectively. In other words, the hall element 81y can capture and convert the magnetic flux $B_d(y)$ into the hall voltage $V_h(y)$. When the hall current Ic is flowed to the hall element 81z which captures the z-axis magnetic flux $B_d(z)$ (referred to as z-axis hall element 81z), the hall element 81z captures the magnetic flux $B_d(z)$ in the vertical direction. Then the hall element 81z generates the hall voltage $V_h(z)$ in directions orthogonal to the current direction and magnetic field direction, respectively. In other words, the hall element 81z can capture and convert the magnetic flux $B_d(z)$ into the hall voltage $V_h(z)$.

A surface magnetic flux density in a magnetic field detecting face of the magnetic field detecting unit 42 will be described below with reference to FIGS. 18 and 19.

Figure 18:
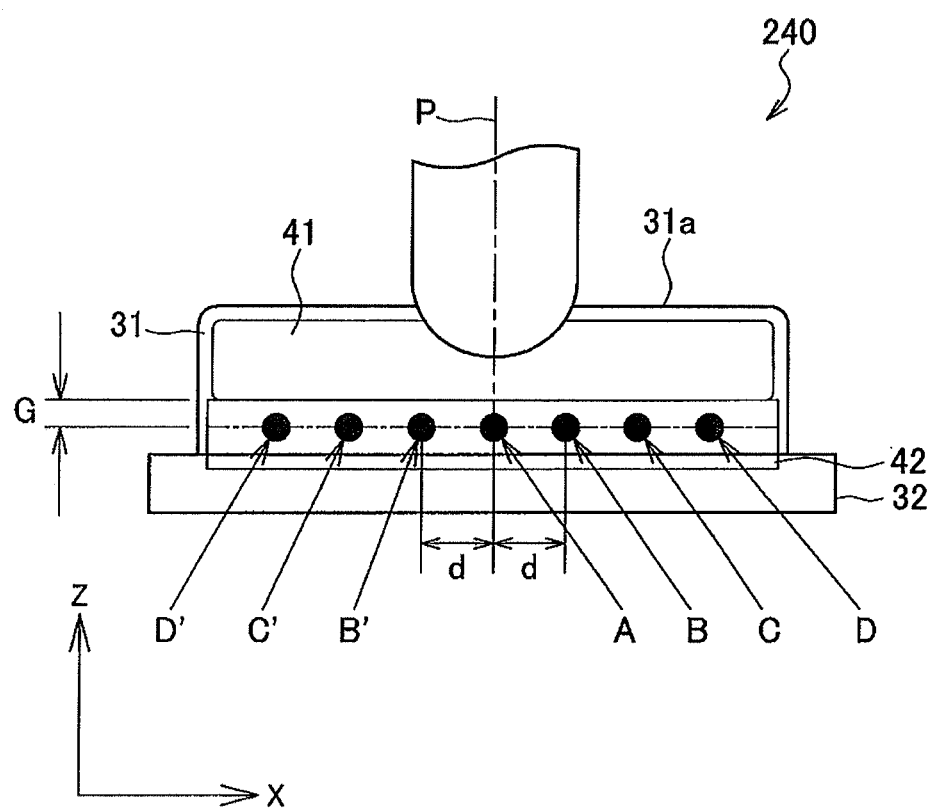
FIG. 18 is a side cross-section view showing an operation inputting unit according to the embodiment.

FIG. 18 is a side cross-section view showing an operation inputting unit 240 according to the present embodiment. In the example of FIG. 18, a magnetic flux is detected by the magnetic field detecting unit 42 in a magnetic flux detecting face which is downwardly apart from the stress magnetic field converting unit 41 by a predetermined distance G (gap). In FIG. 18, there are shown the magnetic flux detecting face, and the x-axis (lateral direction in the Figure) and the z-axis (longitudinal direction in the Figure) among the x-, y- and z-axes of the XYZ coordinate system where an intersection point with a perpendicular passing through the substantial center position of the input plane (xy plane) 31a is assumed as the origin.

The magnetic flux detecting points D', C', B', A, B, C and D are indicated on the magnetic flux detecting face from the left of the Figure. The magnetic flux detecting points are positioned side by side on the magnetic flux detecting face (that is, x-axis) apart from the stress magnetic field converting unit 41 by the distance G. The magnetic field detecting unit 42 detects the surface magnetic flux density occurring outside the stress magnetic field converting unit 41 in each magnetic flux detecting point D', C', B', A, B, C or D.

The magnetic flux detecting point A is substantially at the center position on the x-axis (that is, the origin in FIG. 18), and the magnetic flux detecting points B' and B are symmetrically positioned on the x-axis, both of which are separated from the magnetic flux detecting point A by a certain distance d, respectively. Further, the magnetic flux detecting points C' and C are symmetrically positioned on the x-axis, both of which are separated from the magnetic flux detecting point A by double the distance d, and the magnetic flux detecting points D' and D are symmetrically positioned on the x-axis, both of which are apart from the magnetic flux detecting point A by triple the distance d.

For example, the magnetic flux detecting point A which is substantially at the center position on the x-axis is assumed as the load center P so that a load is applied to the inputting unit 31.

Figure 19:
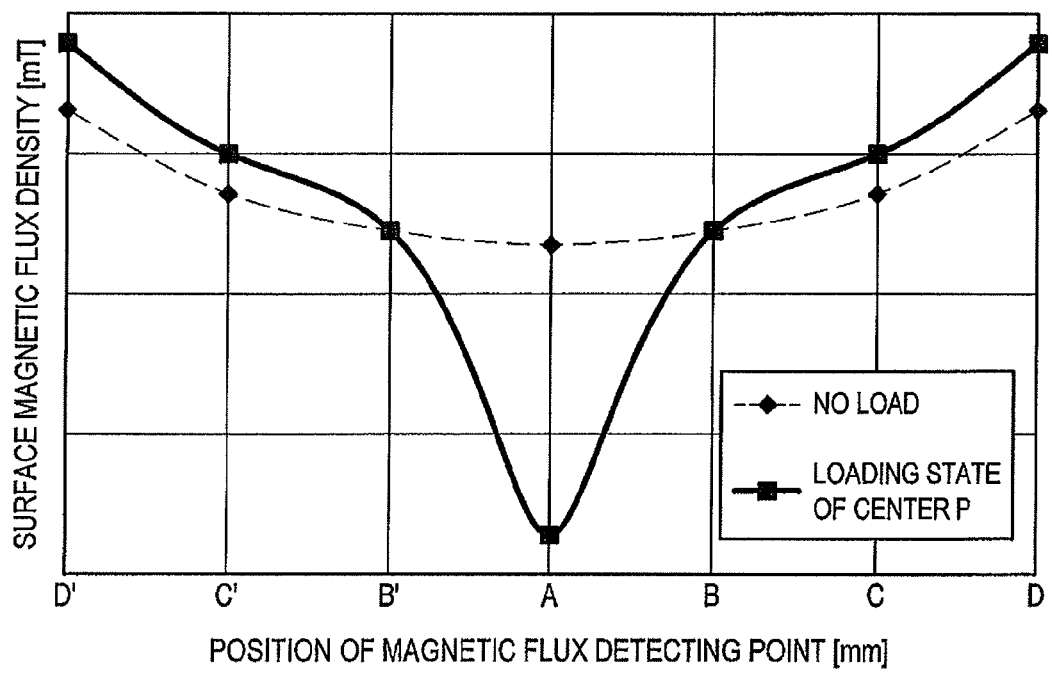
FIG. 19 is a graph showing a distribution example of a surface magnetic flux density in the z-axis direction detected at each magnetic flux detecting point of FIG. 18.

FIG. 19 is a graph showing a distribution example of the surface magnetic flux densities in the z-axis direction which are detected in the respective magnetic flux detecting points of FIG. 18. In the example of FIG. 19, the vertical axis indicates the surface magnetic flux density [mT] in the z-axis direction and the horizontal axis indicates a position [mm] of each magnetic flux detecting point about the magnetic flux detecting point A (that is, a distance from the load center P to each magnetic flux detecting point D', C', B', A, B, C or D of FIG. 18). The dotted line and solid line indicate the surface magnetic flux densities in the z-axis direction before loading and after loading, which are detected in each magnetic flux detecting point of FIG. 18, respectively.

As indicated by the dotted line, the surface magnetic flux density in the z-axis direction before loading becomes smaller toward the magnetic flux detecting point A substantially at the center position of the stress magnetic field converting unit 41 depending on typical characteristics due to magnet shape (cross-section's shape or length). In other words, the magnetic flux density detected at the magnetic flux detecting point A is smallest.

On the contrary, as indicated by the solid line, the surface magnetic flux density in the z-axis direction after loading about the load center P is further reduced near the load center P (that is, magnetic flux detecting point A). Conversely, the surface magnetic flux density in the z-axis direction after loading about the load center P indicates a larger magnetic flux density at the outside apart from the magnetic flux detecting point A by more than the distance d (that is, at the magnetic flux detecting points D', C', B', B, C and D) than in the case of no load (dotted line).

In other words, the magnetic flux density near the load center P, where the thickness is small and the diamagnetic field inside the magnet is large due to load, is small, and the magnetic flux density near the outside, where the thickness is large and the diamagnetic field inside the magnet is small due to budging phenomenon, is large.

As described above, the surface magnetic flux density in the z-axis direction largely relies on the direction and magnitude (vector) of the stress occurring in the material (stress magnetic field converting unit 41) due to load.

In the example of FIG. 19, only the surface magnetic flux density in the z-axis direction measured at each magnetic flux detecting point on the x-axis direction is shown, but a similar result may be obtained even by enlarging the measurement point two-dimensionally (in the xy plane) and measuring the surface magnetic flux density in the z-axis direction from the measurement point on the x-axis in the example of FIG. 19.

In other words, the surface magnetic flux density in the z-axis direction in the case of no load is smaller toward the substantial center position of the load plane 41a about the load center P depending on typical characteristics due to magnet shape (cross-section's shape or length) even when measurement is made by enlarging the measurement point two-dimensionally (in the xy plane).

On the contrary, the surface magnetic flux density in the z-axis direction with load is further reduced near the load center P even when measurement is made by enlarging the measurement point two-dimensionally (in the xy plane). Conversely, the surface magnetic flux density in the z-axis direction with load indicates a slightly larger magnetic flux density near the outside furthest from the load center P than with no load.

In other words, in the example of FIG. 19, even when measurement is made by enlarging the measurement point two-dimensionally (in the xy plane), the magnetic flux density n the z-axis direction near the load center P is made small, where the thickness is small and the diamagnetic field inside the magnet is large due to load. Thus, the magnetic flux density in the z-axis direction is slightly larger near the outside where the thickness is large and the diamagnetic field inside the magnet is small due to bulging phenomenon.

The larger the contact area in the load plane 41a to which a load is applied, the smaller the surface magnetic flux density in the z-axis direction near the load center P is. In other words, the surface magnetic flux density in the z-axis direction when enlarging and measuring the measurement point two-dimensionally (in the xy plane) closely depends on not only the direction and magnitude (vector) of the stress occurring in the material (stress magnetic field converting unit 41) due to load but also the load-applied contact area.

Figure 20:
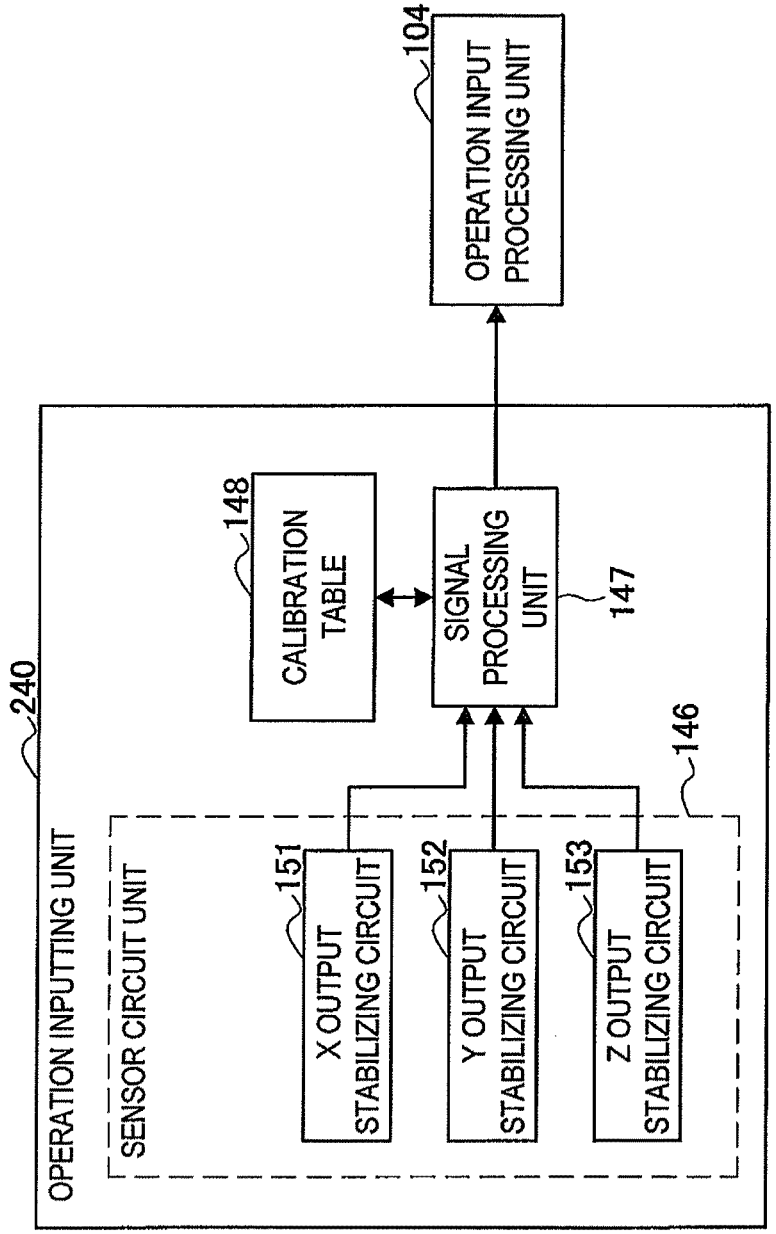
FIG. 20 is a block diagram showing an electric structure of the operation inputting unit according to the embodiment.

An electric structure of the operation inputting unit 240 according to the present embodiment will be described below with reference to FIG. 20. FIG. 20 is a block diagram showing an electric structure of the operation inputting unit 240 according to the present embodiment.

In the example of FIG. 20, the operation inputting unit 240 is connected to the operation input processing unit 104 in the content editing apparatus 100.

The operation inputting unit 240 is configured to include a sensor circuit unit 146 and a signal processing unit 147. The sensor circuit unit 146 is configured to include an x-output stabilizing circuit 151, a y-output stabilizing circuit 52 and a z-output stabilizing circuit 153, and stabilizes output voltages from the aforementioned hall element group 91 to output the final output voltages in the respective axes to the signal processing unit 147.

The x-output stabilizing circuit 151 differentially amplifies the output voltages from the x-axis hall elements 81x1 and 81x2 to generate a stabilized x-axis final output voltage $V_{hx}$ and to output the x-axis final output voltage $V_{hx}$ to the signal processing unit 147. The y-output stabilizing circuit 152 differentially amplifies the output voltages from the y-axis hall elements 81y1 and 81y2 to generate a stabilized y-axis final output voltage $V_{hy}$ and to output the y-axis final output voltage $V_{hy}$ to the signal processing unit 147. The z-output stabilizing circuit 153 amplifies an output voltage from the z-axis hall element 81z to generate a stabilized z-axis final output voltage $V_{hz}$ and to output the z-axis final output voltage $V_{hz}$ to the signal processing unit 147.

The signal processing unit 147 sends a reproduction operating command corresponding to a change in output voltage to the operation input processing unit 104 from the output voltage of the sensor circuit unit 146 based on the operation state in the operation inputting unit 240.

Figure 21:
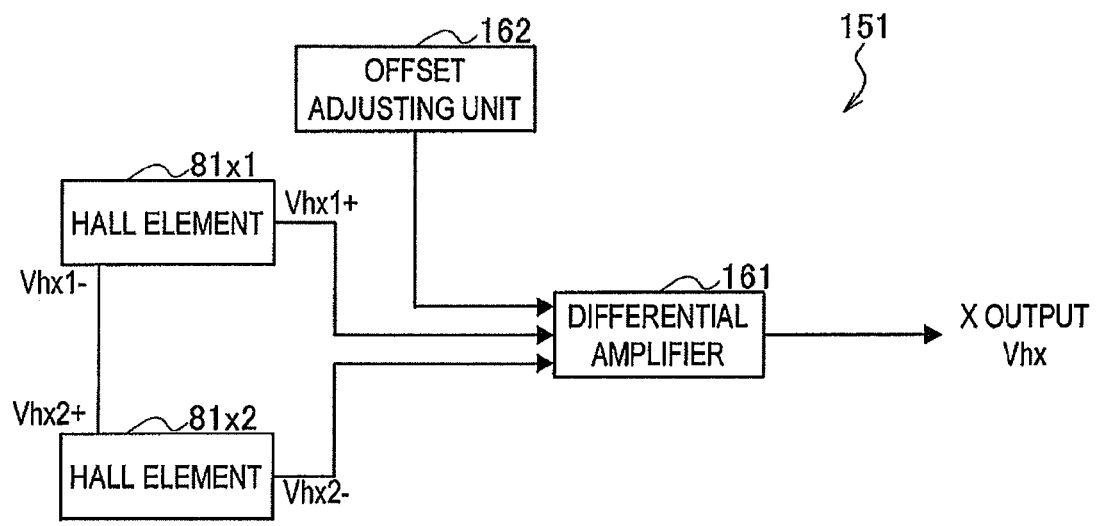
FIG. 21 is a block diagram showing a structure example of an x-output stabilizing circuit according to the embodiment.

The x-output stabilizing circuit 151 will be described below with reference to FIG. 21. FIG. 21 is a block diagram showing a structure example of the x-output stabilizing circuit 151 according to the present embodiment. The y-output stabilizing circuit 152 basically has the same structure as the x-output stabilizing circuit 151 shown in FIG. 21 and the description and illustration thereof will be omitted for avoiding repetition.

In the example of FIG. 21, the x-output stabilizing circuit 151 is configured to include the hall elements 81x1 and 81x2, a differential amplifying unit 161 and an offset adjusting unit 162.

The hall elements 81x1 and 81x2 capture the magnetic flux $B_d(x)$ in the vertical direction and generate an output voltage in directions orthogonal to the current direction and the magnetic field direction, respectively. In other words, a positive output voltage $V_{hx1+}$ and a negative output voltage $V_{hx1-}$ are output from the hall element 81x1, and a positive output voltage $V_{hx2+}$ and a negative output voltage $V_{hx2-}$ are output from the hall element 81x2. In the example of FIG. 21, the negative output of the hall element 81x1 and the positive output of the hall element 81x2 are routed in a circuit manner. Thus, the hall elements 81x1 and 81x2 are configured as one hall element so that only the positive output voltage $V_{hx1+}$ from the hall element 81x1 and the negative output voltage $V_{hx2-}$ from the hall element 81x2 are output to the differential amplifying unit 161.

The differential amplifying unit 161 differentiates the positive output voltage $V_{hx1+}$ and the negative output voltage $V_{hx2-}$ from the hall elements 81x1 and 81x2. The differential amplifying unit 161 is based on and amplifies the midpoint voltage of the x-axis final output voltage $V_{hx}$ (referred to as X output below) set by the offset adjusting unit 162. Then, the differential amplifying unit 161 generates the stabilized x-axis final output voltage $V_{hx}$ and outputs the X output to the signal processing unit 147. The differential amplifying unit 161 may be configured as a circuit or may be configured as a computer for subtraction.

The offset adjusting unit 162 adjusts (sets) a value of the midpoint voltage of the X output (initial variation) output from the differential amplifying unit 161. When the operation inputting unit 240 is configured to include a plurality of hall element groups 91, the offset adjusting unit 162 adjusts to unify the magnitude of the midpoint voltage of the X output which is output from the differential amplifying unit 161 of the x-output stabilizing circuit 151 to which other hall element group 91 corresponds. Alternatively, the offset adjusting unit 162 can adjust the value of the midpoint voltage of the X output which is output from the differential amplifying unit 161, which has been offset along with a time-dependent change. The adjustment of the time-dependent change may be performed through an operation by the signal processing unit 147.

In the example of FIG. 21, there is shown an example where the negative output of the hall element 81x1 and the positive output of the hall element 81x2 are routed in a circuit manner. However, in the present invention, the positive output voltage $V_{hx1+}$ and the negative output voltage $V_{hx1-}$ of the hall element 81x1 and the positive output voltage $V_{hx2+}$ and the negative output voltage $V_{hx2-}$ of the hall element 81x2 may be output instead of routing the hall element 81x1 and the hall element 81x2 in the circuit manner. At this time, the differential amplifying unit 161 may be configured for differential.

Figure 22:
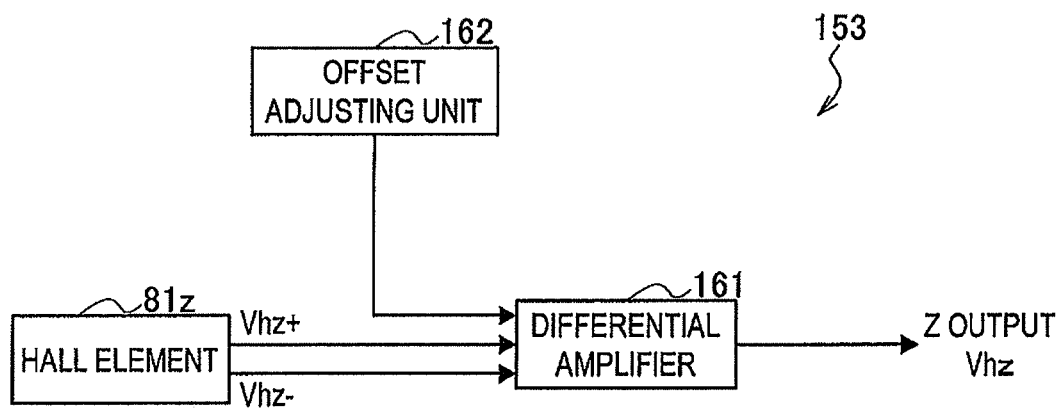
FIG. 22 is a block diagram showing a structure example of a z-output stabilizing circuit according to the embodiment.

The z-output stabilizing circuit 153 will be described below with reference to FIG. 22. FIG. 22 is a block diagram showing a structure example of the z-output stabilizing circuit 153 according to the present embodiment. The z-output stabilizing circuit 153 in FIG. 22 is different from the x-output stabilizing circuit 151 in FIG. 21 in that the two hall elements 81x1 and 81x2 are replaced with one hall element 81z, and is common thereto in that it is configured to include the differential amplifying unit 161 and the offset adjusting unit 162.

The hall element 81z captures the magnetic flux $B_d(Z)$ in the vertical direction and generates a positive output voltage $V_{hz+}$ and a negative output voltage $V_{hz-}$ in directions orthogonal to the current direction and the magnetic field direction. The positive output voltage $V_{hz+}$ and the negative output voltage $V_{hz-}$ from the hall element 81z are output to the differential amplifying unit 161.

The differential amplifying unit 161 and the offset adjusting unit 162 are similarly configured as in the example of FIG. 21. In the example of FIG. 22, the differential amplifying unit 161 differentiates the positive output voltage $V_{hz+}$ and the negative output voltage $V_{hz-}$ from the hall element 81z. The differential amplifying unit 161 is based on and amplifies the midpoint voltage of the z-axis final output voltage $V_{hz}$ (also referred to as Z output below) set by the offset adjusting unit 162. Then the differential amplifying unit 161 generates a stabilized z-axis final output voltage $V_{hz}$ and outputs the Z output to the signal processing unit 147.

The offset adjusting unit 162 adjusts (sets) the value of the midpoint voltage of the Z output at the time of initial shipment, which is output from the differential amplifying unit 161. When the operation inputting unit 240 is configured to include a plurality of hall element groups 91, the offset adjusting unit 162 adjusts to unify the magnitude of the midpoint voltage of the Z output which is output from the differential amplifying unit 161 of the z-output stabilizing circuit 153 to which other hall element group 91 corresponds. Alternatively, the offset adjusting unit 162 adjusts the magnitude of the midpoint voltage of the Z output which is output from the differential amplifying unit 161, which has been offset along with a time-dependent change.

Figure 23:
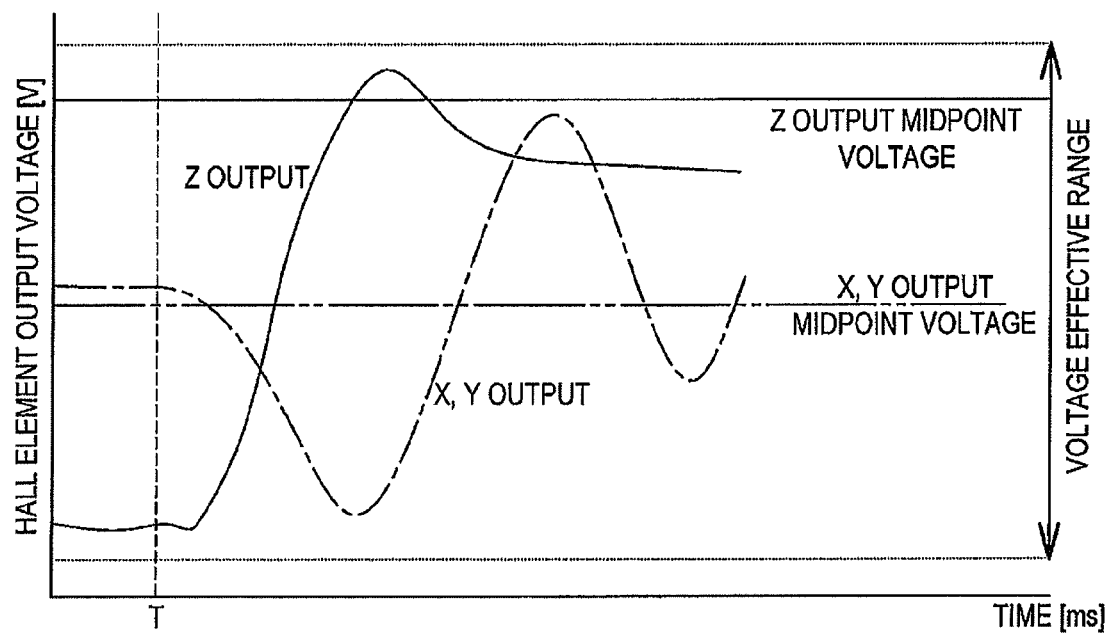
FIG. 23 is a graph showing a midpoint voltage of a final output voltage.

The midpoint voltage of the final output voltage set by the offset adjusting unit 162 will be described below with reference to FIG. 23. FIG. 23 is a graph showing the midpoint voltage of the final output voltage. In the example of FIG. 23, there are shown with time [ms] an output voltage [V] from each hall element, a midpoint voltage with no load and a voltage effective range (within dotted line in the Figure). The output voltage of only the bias magnetic field with no load input is indicated until the time T and the output voltage when the bias magnetic field has been changed due to load input is indicated after the time T.

The X and Y output voltages take a value substantially at the center of the voltage effective range before loading as indicated by a dashed-dotted line, and may change in the bias magnetic field and largely invert in the direction of the magnetic field density vector when a load is applied after the time T. The midpoint voltage of the X and Y outputs is set substantially at the center of the effective range.

On the other hand, the Z-output voltage takes a value in either side of the voltage effective range (lower side in the case of FIG. 23) before loading as indicated by a solid line, and the magnetic flux density vector does not largely invert due to the load direction, sensor shape or material characteristics even when a load is applied after the time T. Thus, the midpoint voltage of the Z output is set to be in either side of the voltage effective range (upper side in the case of FIG. 23) for broadly utilizing the effective range. However, since a deformation occurs though not much such that the material (stress magnetic field converting unit 41) expands near the load object at the time of loading, the midpoint voltage of the Z output needs to be set not by setting just in the voltage effective range but by considering a certain margin.

A change in the bias magnetic field B depending on the deformation of the stress magnetic field converting unit 41, that is, information capable of being obtained using the change in the voltage output from the hall element 81 will be described below.

Figure 24:
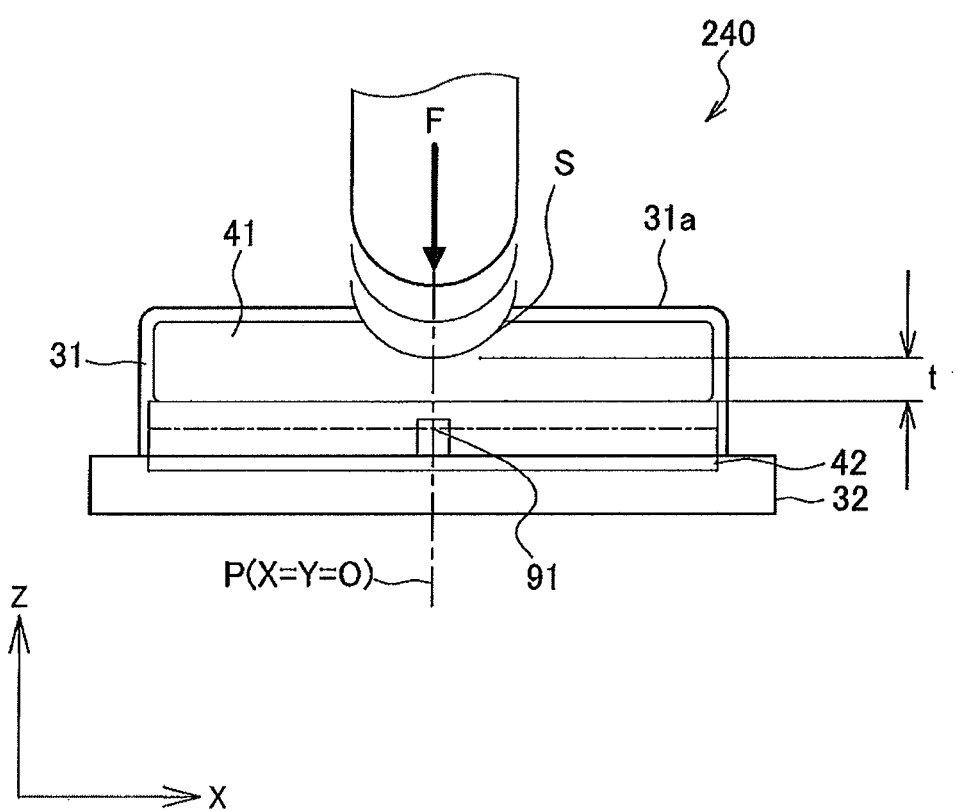
FIG. 24 is a side cross-section view showing the operation inputting unit according to the embodiment.
Figure 25:
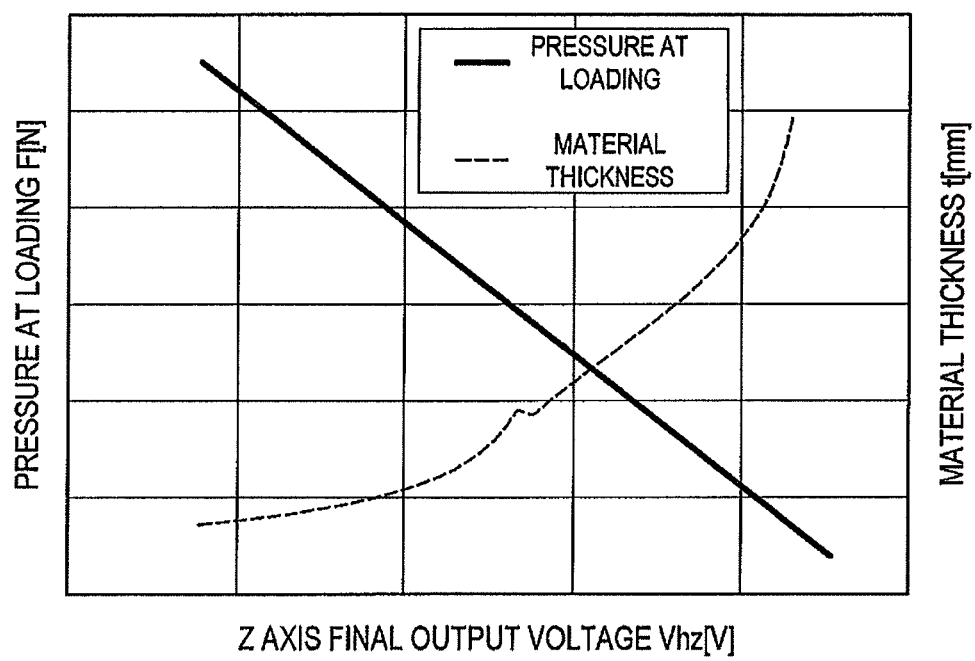
FIG. 25 is a graph showing a relationship among a final output voltage from the z-axis hall element, load (pressure value) and material thickness.

A load pressure and a depth which are calculated (assumed) when detecting the operation state of the operation inputting unit 240 will be first described using the change in the voltage output from the hall element 81 with reference to FIGS. 24 and 25.

FIG. 24 is a side cross-section view showing the operation inputting unit 240 according to the present embodiment. In the example of FIG. 24, the circuit board 61 (magnetic field detecting unit 42) arranged such that one hall element group 91 is at the center of the input plane 31a is fixed to the fixing unit 32 at the lower side of the stress magnetic field converting unit 41. In FIG. 24, the x-axis (lateral direction in the Figure) and the z-axis (longitudinal direction in the Figure) are indicated among the x-, y- and z-axes in the XYZ coordinate system where the hall element group 91 is assumed as the origin.

An arbitrary position on the operation inputting unit 240 (in the example of FIG. 24, immediately above the hall element group 91 (x=y=0)) is assumed as the load center P and an arbitrarily-shaped object is applied a load F at the contact area S. A relationship among the final output voltage $V_{hz}$ from the z-axis hall element 81x, the pressure value F when loaded and the material (stress magnetic field converting unit 41) thickness t on the hall element group 91 is represented as shown in FIG. 25.

FIG. 25 is a graph showing a relationship among the final output voltage $V_{hz}$ from the z-axis hall element 81z, the load (pressure value) F and the material thickness t in the example of FIG. 24. In the example of FIG. 25, the horizontal axis denotes the final output voltage $V_{hz}$[V] from the z-axis hall element 81z and the solid line denotes the pressure value F[N] when loaded, and the dotted line denotes the material thickness t[mm].

As indicated by the solid line, as the pressure value F when loaded increase, the final output voltage $V_{hz}$ decreases. As indicated by the dotted line, as the material thickness t increases, the final output voltage $V_{hz}$ also increases.

As described above, when the final output voltage $V_{hz}$ from the z-axis hall element 81z is determined, the pressure value F when loaded and the material thickness t are uniquely determined. Thus, the loaded pressure and the depth T (original material thickness t−loaded material thickness t) are enabled to assume depending on the final output voltage from the z-axis hall element 81z, thereby accurately detecting the grip state.

In the above description, there has been described the case where the load center P is immediately above the hall element group 91 (x=y=0). When the final output voltage $V_{hz}$ from the z-axis hall element 81z is determined, even when the load center P is at other position, the loaded pressure value F and the material thickness t are uniquely determined.

In this case, the two values (loaded pressure value F and material thickness t) are estimated by a formula which is different depending on the distance of the load center P about the position of the hall element group 91 for detecting the magnetic flux in the xy plane. However, when the load center P is on a concentric circle about the position of the hall element group 91, substantially the same calculation result must be obtained.

The exchange of the formulas along with the distance of the load center P from the position of the hall element group 91 is enabled by a combination with load position assumption described later with reference to FIGS. 26 and 27 or multipoint load calibration by the hall element group 91. In other words, the multipoint load calibration means that a calibration table 148 previously stores therein which formula to use when a load is applied to each point (such as x=1, y=0) for a plurality of points on the input plane 31a.

Further, a load position calculated (assumed) at the time of detecting the operation state of the operation inputting unit 240 will be described using a change in the voltage output from the hall element 81 with reference to FIGS. 26 and 27.

Figure 26:
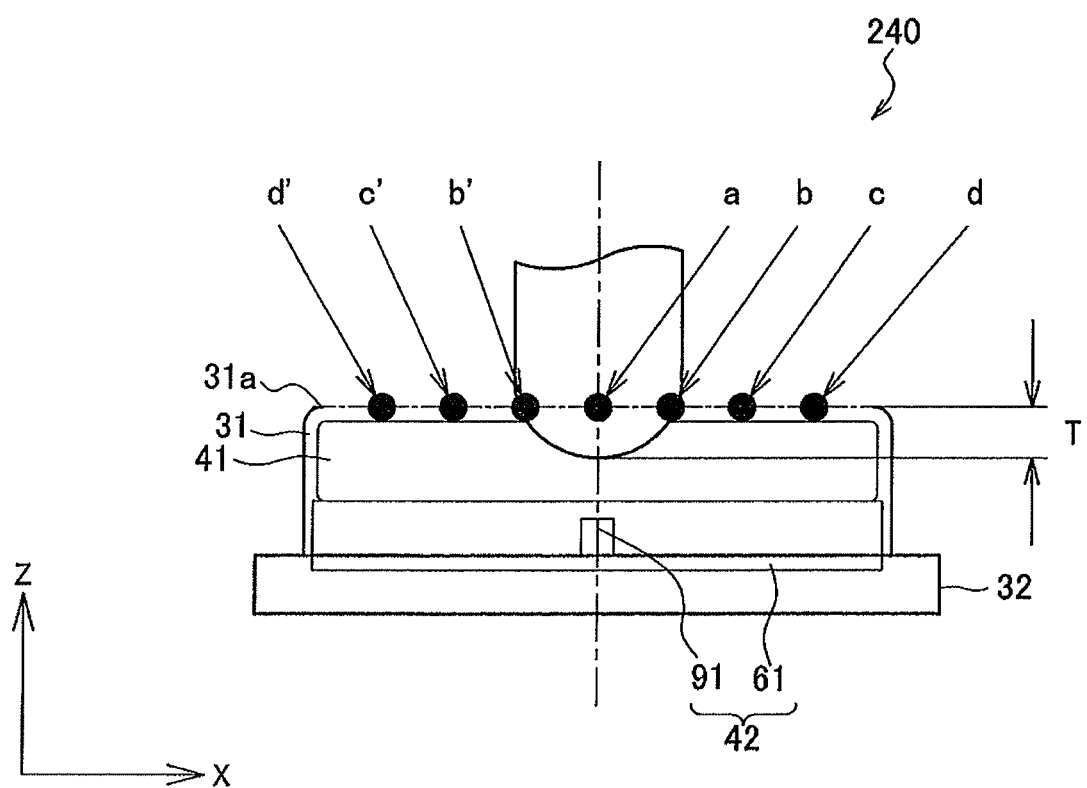
FIG. 26 is a side cross-section view showing the operation inputting unit according to the embodiment.

FIG. 26 is a side cross-section view showing the operation inputting unit 240 according to the present embodiment. In the example of FIG. 26, the x-axis (lateral direction in the Figure) and the z-axis (longitudinal direction in the Figure) are indicated from among the x-, y- and z-axes in the XYZ coordinate system where the center position of the input plane (xy plane) 31a is assumed as the origin. The magnetic field detecting unit 42 which is configured such that the hall element group 91 is arranged immediately below the origin on the circuit board 61 is fixed to the fixing unit 32 at the lower side of the stress magnetic field converting unit 41.

On the input plane 31a (x-axis), the load positions d', c', b', a, b, c and d are indicated from the left of the Figure about the load center P of the arbitrarily-shaped object on the x-axis of the input plane 31a. In the example of FIG. 26, the stress magnetic field converting unit 41 is pressed down by a depth T at the load position a due to the arbitrarily-shaped object's load assuming the load position a as the load center P.

The load position a is substantially at the center on the x-axis (that is, immediately above the hall element group 91), and the load positions b' and b are symmetrically positioned on the x-axis, both of which are apart from the load position a by a certain distance D. Further, the load positions c' and c are symmetrically positioned on the x-axis, both of which are apart from the load position a by double the distance D, and the load positions d' and d are symmetrically positioned on the x-axis, both of which are apart from the load position a by triple the distance D.

For example, the position as the load center P is moved from the load position d' toward the load position d while a load is being applied so as to press the inputting unit 31 by an arbitrary depth T. Correspondingly, a relationship between the x-axis final output voltage $V_{hx}$ and the z-axis final output voltage $V_{hz}$ is to be shown in FIG. 27. FIG. 27 is a graph showing a relationship among the load position on the x-axis, the x-axis final output voltage $V_{hx}$ and the z-axis final output voltage $V_{hz}$.

Figure 27:
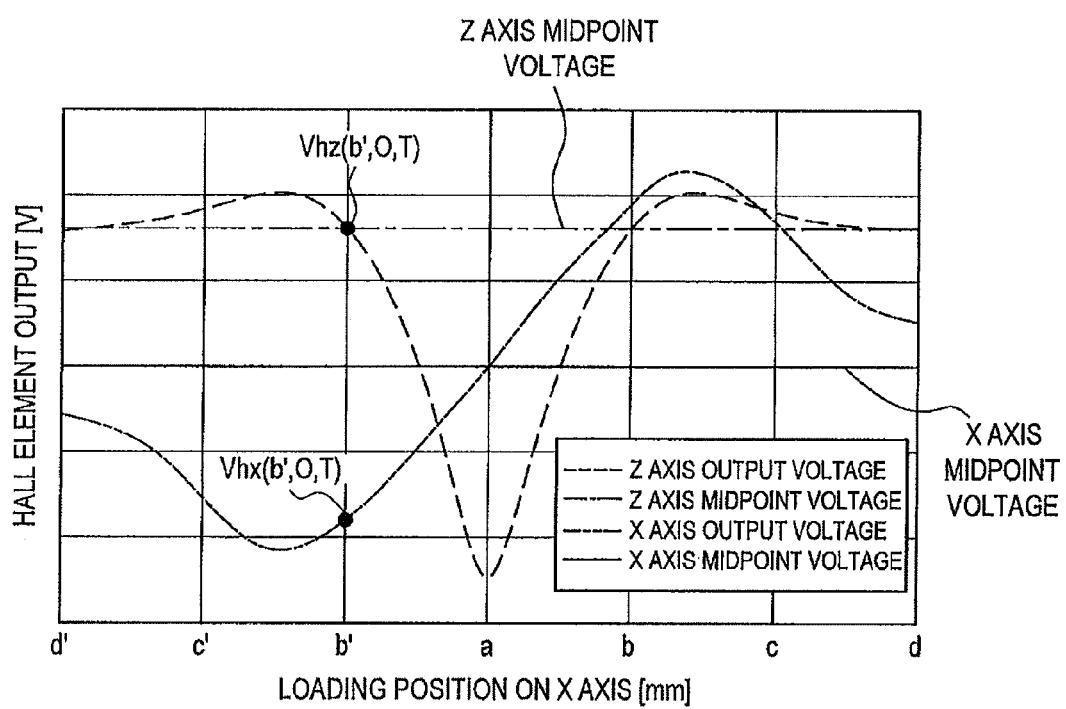
FIG. 27 is a graph showing a relationship between a load position on the x-axis and an x-axis final output voltage as well as a z-axis final output voltage.

In the example of FIG. 27, the horizontal axis represents the load positions d', c', b', a, b, c, and d [mm] on the x-axis. FIG. 27 represents the z-axis final output voltage $V_{hz}$[V], the z-axis midpoint voltage [V], the x-axis final output voltage $V_{hx}$[V] and the x-axis midpoint voltage [V] when the position as the load center P is moved to each load position.

The z-axis hall element 81z configuring the hall element group 91 detects the magnetic flux $B_d(z)$ in the vertical direction relative to the input plane 31a (parallel direction relative to the z-axis) and outputs the z-axis final output voltage $V_{hz}$. Thus, the z-axis final output voltage $V_{hz}$ gradually becomes larger due to bulging phenomenon from the same value as the midpoint voltage until the position as the load center P is moved from the load position d' furthest from the hall element group 91 toward a position slightly near the load position b'. Further, the z-axis final output voltage $V_{hz}$ gradually becomes smaller through the same value as the midpoint voltage at the load position b' until the position as the load center P is moved from the position slightly near the load position b' toward the load position a. The z-axis final output voltage $V_{hz}$ is minimum when the load position a immediately below the hall element group 91 is assumed as the load center P and a load is applied thereto to be pressed down by an arbitrary depth T.

The z-axis final output voltage $V_{hz}$ gradually becomes larger through the same value as the midpoint voltage at the load position b' until the position as the load center P is moved from the load position a toward a position slightly beyond the load position b. Further, the z-axis final output voltage $V_{hz}$ gradually becomes smaller as the value slightly larger than the midpoint voltage approaches the midpoint voltage due to bulging phenomenon after the position as the load center P passes through the position slightly beyond the load position b (including the load position d furthest from the hall element group 91).

As described above, when the position as the load center P is moved from the load position d' toward d, the z-axis final output voltage $V_{hz}$ takes a symmetric (line-symmetric) value relative to the position (load position a) immediately above the hall element group 91 (the input plane 31$a$).

On the other hand, the x-axis hall element 81$x$ configuring the hall element group 91 detects the magnetic flux $B_d(x)$ in the vertical direction relative to the z-axis (parallel direction relative to the input plane 31$a$) and outputs the x-axis final output voltage $V_{hx}$. Therefore, the x-axis final output voltage $V_{hx}$ gradually becomes smaller until the position as the load center P is moved from the load position d' furthest from the hall element group 91 toward a position substantially between the load positions c' and b'. Further, the x-axis final output voltage $V_{hx}$ is minimum when the position substantially between the load positions c' and b' is assumed as the load center P and is applied a load enough to press down by an arbitrary depth T.

The x-axis final output voltage $V_{hx}$ gradually becomes larger through the same value as the midpoint voltage at the load position a until the position as the load center P is moved from the position substantially between the load positions c' and b' toward a position substantially between the load positions b and c. Further, the x-axis final output voltage $V_{hx}$ is maximum when the position substantially between the load positions b and c is assumed as the load center P and is applied a load enough to press down by an arbitrary depth T.

Further, the x-axis final output voltage $V_{hx}$ gradually becomes smaller until the position as the load center P is moved from the position substantially between the load positions b and c toward the load position d.

As described above, when the load center P is moved from the load position d' toward d, the x-axis final output voltage $V_{hx}$ takes a point-symmetric value relative to the position (load position a) immediately above the hall element group 91 (the input plane 31$a$).

The load position b' (b', 0, T) on the x-axis is uniquely determined by the above result such as the x-axis final output voltage $V_{hx}$(b', 0, T) and the z-axis final output voltage $V_{hz}$(b', 0, T). This is similarly applicable to the y-axis. In other words, though not illustrated, the graph represents that the y-axis final output voltage $V_{hy}$ is substantially symmetric relative to the x-axis final output voltage $V_{hx}$ for the x-axis midpoint voltage in FIG. 27. Therefore, the load position over the input plane (xy plane) 31$a$ of the operation inputting unit 240 can be estimated by using a combination of the x-axis final output voltage $V_{hx}$ and the y-axis final output voltage $V_{hy}$, the z-axis final output voltage $V_{hz}$ and the multipoint load calibration by the above hall element group 91.

The estimation of the load position from the load to the operation inputting unit 240 will be described below.

The inputting unit 31 is configured to include a viscoelastic magnet (stress magnetic field converting unit 41) having the magnetic flux density $B_d$ due to the bias magnetic field. The hall element group 91 configured to include the x-axis hall elements 81$x$1 and 81$x$2, the y-axis hall elements 81$y$1 and 81$y$2 and the z-axis hall element 81$z$, which constitutes the magnetic field detecting unit 42, is arranged inside the inputting unit 31 immediately below the origin similarly as in FIG. 24 or 26.

The inputting unit 31 has the conditions or material characteristics such as the magnetic field density $B_d$ due to the bias magnetic field, the thickness t of the viscoelastic magnet, the contact area S' by an arbitrary object, a spring constant (elastic coefficient) G and a viscosity coefficient η.

The inputting unit 31 configured in this manner is applied, as the load center P(x, y, z), a load F at the contact area S' by an arbitrary object due to pulling load, contact, sliding or vibration phenomenon by the arbitrary object. Thus, the inputting unit 31 made of the viscoelastic magnet deforms and the magnetic flux density due to the bias magnetic field also changes. At this time, each axis's hall element 81 constituting the hall element group 91 outputs a voltage from its magnetic flux density. The final output voltages $V_{hx}$, $V_{hy}$ and $V_{hz}$, which are stabilized, are output to the signal processing unit 147, respectively.

The signal processing unit 147 previously stores therein the calibration table 148 for multipoint load calibration aforementioned with reference to FIG. 25. The signal processing unit 147 uses the three x-, y- and z-axis final output voltages to estimate the contact center position (that is, load center) P(x, y, z) with an arbitrary object or a pressure value (that is, load) F occurring at the contact center position by, as needed, referring to the calibration table 148. Then, the signal processing unit 147 can obtain a static state or dynamic behavior of the arbitrary object as the object's contact state by referring to the conditions or material characteristics such as the magnetic flux density $B_d$ due to the bias magnetic field, the thickness t of the viscoelastic magnet, contact area S' by arbitrary object, spring constant (elastic coefficient) G and viscosity coefficient η which are owned by the inputting unit 31.

Furthermore, the operation inputting unit 240 sends a reproduction operating command corresponding to the contact center position P(x, y, z) and the pressure value F to the operation input processing unit 104.

In the example of FIGS. 24 and 26 described above, only one hall element group 91 is shown on the circuit board 61 but a plurality of hall element groups 91 can be arranged therein according to the present invention. Hereinafter, the plurality of hall element groups 91 are referred to as a sensor matrix.

In the sensor matrix, for example, nine hall element groups 91 may be arranged in 3 columns longitudinally (in the y-axis direction) and 3 rows horizontally (in the x-axis direction). In this case, each hall element group 91 is configured to include the x-axis hall elements 81$x$1 and 81$x$2, the y-axis hall elements 81$y$1 and 81$y$2 and the z-axis hall element 81$z$ similarly as in the case of FIG. 16.

Further, in the sensor matrix, four hall element groups 91 may be arranged in two columns longitudinally (in the y-axis direction) and 2 rows horizontally (in the x-axis direction). Furthermore, in the sensor matrix, five hall element groups 91 may be arranged in a crossing manner. In the sensor matrix, four hall element groups 91-1 to 91-4 may be longitudinally arranged in one line.

As described above, a plurality of hall element groups 91 may be arranged on the circuit board 61 to constitute the magnetic field detecting unit 42 depending on the size or shape of the input plane 31*a* of the inputting unit 31. Thus, it is possible to prevent the detection accuracy from being reduced even for any input plane 31*a*.

In the above description, there has been described the case where the estimation of the pressure or pressing depth and the position on the input plane is possible due to the hall element group 91 configured with the hall elements 81 of the three axes. The present invention may be configured with the hall elements 81 of the two axes among the x-axis, y-axis and z-axis elements (it is desirable that the z-axis is included). Even in this case, a similar effect as in the case of the three axes is obtained. In other words, the contact center position with an object to be gripped or the pressure value (pressure or pressing depth) occurring at the contact center position can be estimated as the object's grip state. In the case of the three axes, the positional estimation in the input plane is enabled, but in the case of the two axes, the positional estimation is possible but it is limited to either the y-axis or the x-axis.

The hall element group 91 may be configured to include the hall element 81 of any one axis (z-axis is desirable) among the x-axis, y-axis and z-axis elements. In the case of one axis, the load position is difficult to estimate and the pressure and the pressing depth can be estimated unlike in the case of the two or three axes.

The hall element group 91 may be configured to include the hall elements 81 of four or more axes instead of being limited to one to three axes described above.

As noted above, the inputting unit for inputting information from an object in the operation inputting unit 240 is configured to include a viscoelastic magnet and to detect a change in the bias magnetic field B depending on a deformation of the viscoelastic magnet as a change in the voltage by the hall elements based on a change in the magnitude or direction of the magnetic flux density. Consequently, it is possible to precisely obtain information such as the contact position with an object to contact, pressure or pressing depth. Thus, since the contact state is detected, various kinds of the contact state are corresponded to various reproduction operating commands for each kind so that the operation inputting unit 240 can send a reproduction operating command corresponding to the kind of the contact state to the operation input processing unit 104.

Various reproduction operating commands corresponding to the kinds of the contact state may be configured such that, for example, the z-axis pressing detection corresponds to the reproducing start command, the z-axis pressing cancel detection corresponds to the reproduction stop command, and the x-axis contact position detection corresponds to the reproduction speed. Further, for the x-axis contact position detection, the reproduction direction may be changed depending on a direction relative to the origin and the reproduction speed may be changed depending on a distance from the origin. For example, the forward reproduction speed is adjusted for the positive x-axis direction and the reverse reproduction speed is adjusted for the negative −x-axis direction. Further, when the standard reproduction speed is assumed as v=1, reproduction may be performed at the reproduction speed of 0<v≤1 within a predetermined distance from the origin and at the reproduction speed of v>1 when the predetermined distance is exceeded.

A series of processings described above can be executed in hardware or in software.

When the series of processings is executed in software, programs constituting the software are installed in a computer incorporated into a dedicated hardware from a program recording medium. Alternatively, various programs are installed so that the above programs are installed from the program recording medium into a general-purpose personal computer capable of executing various functions.

An input information detecting processing of the operation inputting unit 240 will be described below with reference to FIG. 20.

For example, a user contacts an arbitrary object to the operation inputting unit 240 to operate the operation inputting unit 240 so that pulling load, contact, sliding or vibration phenomenon occurs between the operation inputting unit 240 and the arbitrary object. Next, the stress magnetic field converting unit 41 configured to include a viscoelastic magnet due to its object's shape and stress starts to deform so that the bias magnetic field B applied to the stress magnetic field converting unit 41 changes. The magnetic flux density $B_d$ inside the viscoelastic magnet due to the bias magnetic field B is represented by the following formula (1).

[Formula 1]

$$B_d = J - \mu_0 H_d \quad (1)$$

Where, $B_d$ denotes the magnetic flux density [T] or [Wb/m²] inside the magnet, J denotes the magnetic polarization [T], $\mu_0$ denotes the vacuum magnetic permeability [μH/m] or [Wb/m²], and $H_d$ denotes the intensity [A/m] of the magnetic field inside the magnet.

In other words, as aforementioned with reference to FIG. 15, the magnetic flux occurring outside the magnet also changes along with the change in the diamagnetic field inside the magnet. Correspondingly, the hall element group 91 configured to include the hall elements 81 of the three axes detects the change in the magnetic flux occurring at the surface of the adjacent stress magnetic field converting unit 41, conducts the magnetoelectric transduction, and outputs a voltage to the corresponding differential amplifying unit 161. The magnetoelectric transduction in the hall element group 91 is represented by the following formula (2).

[Formula 2]

$$V_{h(x,y,z)} = (R_h I_c B_{d(x,y,z)})/d \quad (2)$$

Where, $V_{h(x,y,z)}$ denotes a hall voltage [V] of each axis, $R_h$ denotes a resistance value [Ω] of the hall element, $I_c$ denotes a current value [A], $B_{d(x,y,z)}$ denotes the magnetic flux density [T] of each axis, and d denotes the thickness [nm] of the hall element.

Next, the differential amplifying unit 161 optimally stabilizes the output voltage from the hall element 81 based on the preset midpoint voltage of each output. In other words, the differential amplifying unit 161 differentiates the output voltage from the hall element 81, is based on and amplifies the midpoint voltage below the bias magnetic field B by performing the gain adjustment, and generates the stabilized final output voltage to output the final output voltage to the signal processing unit 147.

Next, the signal processing unit 147 detects the contact state of the object from the final output voltages of the three x-, y- and x-axes. For example, the signal processing unit 147 calculates the contact center position relative to the object to be gripped and the pressure value occurring at the contact center position from the final output voltages of the three x-, y- and x-axes to detect the contact state. The information on the detected contact state is converted into a corresponding reproduction operating command and is output to the operation input processing unit 104 in real-time.

Subsequently, the operation input processing unit 104 determines whether to terminate the processing, and if it is determined that the processing is not terminated, the processing returns to the start and repeats the subsequent processing. On the other hand, if it is determined that the processing is terminated, the processing is terminated.

As described above, the inputting unit 31 into which the information on the object is input is configured to include the stress magnetic field converting unit 41 made of the viscoelastic magnet. Consequently, the change in the bias magnetic field B depending on the deformation of the stress magnetic converting unit 41 due to pulling load, contact, sliding or vibration phenomenon occurring relative to the contacting object is detected by the hall element 81 as the change in voltage from the change in the magnitude or direction of the magnetic flux density. Then, the information on the contact position with the contacting object is precisely obtained.

In other words, the state such as pulling load, contact, sliding or vibration phenomenon occurring relative to the contacting object is detected. Thus, since the contact state is detected, various kinds of the contact state are corresponded to various reproduction operating commands for each kind so that the operation inputting unit 240 can send a reproduction operating command corresponding to the kind of the contact state to the operation input processing unit 104.

The reproducing operation using the above operation inputting unit 240 can perform physical interaction with high affinity for a person because of the flexible material of the inputting unit (viscoelastic magnet).

In this manner, the flexible and slidable material with high affinity for a person is used for the inputting unit so that various functions can be exhibited as an inputting device for real machine or virtual space. For example, not only force or pressure but also strike slip or stick slip phenomenon of material itself can be expressed so that novel interface can be configured to include various inputting unit (that is, expression).

The operation inputting unit 240 has a simple structure to be configured to include three elements such as viscoelastic magnet, circuit board for detection and fixing unit. The viscoelastic magnet uses a material such as silicon gel for binder to have a characteristic that it can largely deform with small force, which can be fabricated by a typical rubber magnet molding method at low cost and is easily handled. Further, the element for detecting a change in the magnetic flux density vector can be realized such that a plurality of typical hall elements are combined to be accurately arranged for the viscoelastic magnet applied with the bias magnetic field, which can be easily realized at low cost.

When the operation inputting unit 240 according to the present embodiment is used, the reproduction direction or reproduction speed can be adjusted unlike the operation inputting unit in related art (for example, dial-using adjusting method). For example, contents can be easily reproduced by pressing the inputting unit 31 by a user's finger or pulling the same in the y-axis direction while pressing according to the operation inputting unit 240 of the present embodiment. The scene with high interest can be easily operated to be slowly reproduced or repeatedly reproduced. Alternatively, when the scene with no interest comes, the operation from slow reproduction to rapid fast-forward can be easily performed. Furthermore, the operation by the operation inputting unit 240 is adaptable to the scoring depending on the reproduction speed described in the first embodiment (evaluation in which slow reproduction speed causes high score) or the scoring depending on the times of reproduction.

It should be understood by those skilled in the art that various modifications, combinations, sub-combinations and alterations may occur depending on design requirements and other factors insofar as they are within the scope of the appended claims or the equivalents thereof.

For example, in the above embodiments, a threshold is applied for interest degree distribution so that reproduction or file generation of a digest is performed for the sections with high interest degree. According to the present invention, further, the content data on the sections with lower interest degree than the threshold other than the sections with high interest degree may be deleted.

For example, the operation log data is recorded for the content data which has been reproduced once or more by the content editing apparatus according to the present invention so that the interest degree distribution in the time axis direction can be displayed. Then, the sections below the threshold can be presented to the user as the sections for deletion candidate. Consequently, the user may perform editing operation such as content data deletion, and if the deleting operation is performed, the capacity occupied by the sections with low interest degree is available.

Thus, since unwanted sections can be easily deleted from the content data, when the data capacity of the video recording device for recording content data such as home server or hard disk recorder is finite, the finite data capacity can be efficiently used.

In the above embodiments, there has been described the case in which the content editing apparatus 100 connected to the video recording device 118 having the content data recorded therein is a single stand-alone apparatus, but the present invention is not limited to this example. For example, as shown in FIG. 28, the present invention may be a content editing system which is configured to include a server 200 and a plurality of user terminals 202 connected to the server 200 via the network 10. FIG. 28 is an explanatory diagram showing the content editing system according to one embodiment of the present invention.

The plurality of user terminals 202 are connected with each other via the network 10 or the like and have the same content data. Then, the user terminals 202 reproduce the content data so that the respective operation log data is generated and the interest degree distribution is produced. Further, averaging is performed for the interest degree distribution by several users, thereby obtaining the interest degree distribution in the time axis direction which reflects the interest degree of the users. Consequently, file generation or reproduction of the digest of the sections with high users' interest can be performed. On the contrary, the sections with no users' interest can be easily extracted.

The present invention may be configured to include user interface capable of designating the length of the digest content data when the user performs file generation or reproduction of the digest. The content editing apparatus calculates an appropriate threshold depending on the length of the input time. As a result, content data which has user-desired time length and whose sections with high interest degree are extracted can be easily created.

In the above embodiments, the interest degree distribution in the time axis direction is assumed to be calculated based on the operation log data generated by the user's operation but the present invention is not limited thereto. For example, the interest degree distribution in the time axis direction may be previously prepared by a content provider which manages the content data. The user can uses the interest degree distribution prepared by the content provider to reproduce the digest content data. Furthermore, an interest degree distribution can be newly generated in combination with the operation log data generated by the user's operation or either one interest degree distribution can be alternatively selected.

The present application contains subject matter related to that disclosed in Japanese Priority Patent Application JP 2008-076690 filed in the Japan Patent Office on Mar. 24, 2008, the entire content of which is hereby incorporated by reference.

What is claimed is:

1. A content editing apparatus comprising:
    an operation input processing unit into which a reproduction operating command of content data is input by a user;
    a log recording unit for recording log data for respective sections of the content data, said log data being a function of the reproduction operating command and a reproduction position of the respective sections of content data associated with said reproduction operating command;
    a record controlling unit for recording operation data corresponding to the reproduction operating command input into the operation input processing unit along with the reproduction position of the content data in a recording medium; and
    a score calculation unit for calculating a score of said respective sections of content data based on said log data for said respective sections.

2. The content editing apparatus according to claim 1, further comprising a reproduction controlling unit for reproducing, the content data depending on the score of the operation data recorded in the recording medium.

3. The content editing apparatus according to claim 2, wherein the reproduction controlling unit applies a threshold to apportion the content data depending on the score of the respective sections of content data and to extract and reproduce the apportioned content data based on the threshold.

4. The content editing apparatus according to claim 2, wherein the reproduction controlling unit controls the reproduction of a section of content data based on the log data recorded for that section of content data so as to reproduce said section of content data corresponding to the reproduction operating command that had been used previously to reproduce said section.

5. The content editing apparatus according to claim 1, further comprising a display controlling unit for visually displaying a time-dependent distribution of the score of the operation data in a displaying device.

6. The content editing apparatus according to claim 5, wherein the display controlling unit visually displays a threshold for apportioning the content data depending on the score of the respective sections of content data in the displaying device, and the operation input processing unit is input with a threshold change command by a user, and further comprises a reproduction controlling unit for applying the threshold to apportion the content data and to extract and reproduce the apportioned content data based on the threshold.

7. The content editing apparatus according to claim 1, further comprising a filing processing unit for applying a threshold to apportion the content data depending on the score of the respective sections of content data, to extract the apportioned content data based on the threshold and to combine the apportioned content data being extracted for generating combined content data.

8. The content editing apparatus according to claim 1, wherein the log recording unit updates the log data previously recorded in the recording medium depending on the reproduction operating command being newly input.

9. The content editing apparatus according to claim 1, wherein the reproduction operating command includes a reproduction direction instructing operation, a reproduction speed instructing operation or a zooming operation.

10. A content editing method comprising the steps of:
    inputting a reproduction operating command of content data by a user;
    a log recording unit for recording log data for respective sections of the content data, said log data being a function of the reproduction operating command and a reproduction position of the respective sections of content data associated with said reproduction operating command;
    recording operation data corresponding to the input reproduction operating command along with the reproduction position of the content data in a recording medium; and
    calculating a score of said respective sections of content data based on said log data for said respective sections.

11. A non-transitory computer-readable record medium storing a program for causing a computer to function as:
    a unit for inputting a reproduction operating command of content data by user;
    a unit for recording log data for respective sections of the content data, said log data being a function of the reproduction operating command and a reproduction position of the respective sections of content data associated with said reproduction operating command;
    a unit for recording operation data corresponding to the input reproduction operating command along with the reproduction position of the content data in a recording medium; and
    a unit for calculating a score of said respective sections of content data based on said log data for said respective sections.

* * * * *